(12) United States Patent
Murali

(10) Patent No.: US 9,798,388 B1
(45) Date of Patent: Oct. 24, 2017

(54) VIBROTACTILE SYSTEM TO AUGMENT 3D INPUT SYSTEMS

(71) Applicant: Aquifi, Inc., Palo Alto, CA (US)

(72) Inventor: Giridhar Murali, Sunnyvale, CA (US)

(73) Assignee: AQUIFI, INC., Palo Alto, CA (US)

( * ) Notice: Subject to any disclaimer, the term of this patent is extended or adjusted under 35 U.S.C. 154(b) by 0 days.

(21) Appl. No.: 14/064,033

(22) Filed: Oct. 25, 2013

Related U.S. Application Data

(60) Provisional application No. 61/860,872, filed on Jul. 31, 2013.

(51) Int. Cl.
*G09G 5/00* (2006.01)
*G06F 3/01* (2006.01)
*G06F 3/0487* (2013.01)

(52) U.S. Cl.
CPC ............ *G06F 3/016* (2013.01); *G06F 3/0487* (2013.01); *G06F 3/017* (2013.01)

(58) Field of Classification Search
CPC . G06F 3/01; G06F 3/014; G06F 3/017; G06F 3/04815; G06F 2203/0331; G06F 2203/0383; G06F 2203/0384
USPC .................................................. 345/156–158
See application file for complete search history.

(56) References Cited

U.S. PATENT DOCUMENTS

| | | | |
|---|---|---|---|
| 5,454,043 A | 9/1995 | Freeman et al. | |
| 5,852,672 A | 12/1998 | Lu | |
| 6,191,773 B1 | 2/2001 | Maruno et al. | |
| 6,323,942 B1 | 11/2001 | Bamji | |
| 6,512,838 B1 | 1/2003 | Rafii et al. | |
| 6,515,740 B2 | 2/2003 | Bamji et al. | |
| 6,522,395 B1 | 2/2003 | Bamji et al. | |
| 6,580,496 B2 | 6/2003 | Bamji et al. | |
| 6,587,186 B2 | 7/2003 | Bamji et al. | |
| 6,614,422 B1 | 9/2003 | Rafii | |
| 6,674,895 B2 | 1/2004 | Rafii et al. | |
| 6,678,039 B2 | 1/2004 | Charbon | |
| 6,690,354 B2 | 2/2004 | Sze | |
| 6,690,618 B2 | 2/2004 | Tomasi et al. | |
| 6,710,770 B2 | 3/2004 | Tomasi et al. | |

(Continued)

FOREIGN PATENT DOCUMENTS

WO 9749262 A1 12/1997
WO 2005091125 A2 9/2005

(Continued)

OTHER PUBLICATIONS

"0V7740 VGA product brief", OmniVision, Retrieved from: http://www.ovt.com/download_document.php?type=sensor&sensorid=83, 2 pgs.

(Continued)

*Primary Examiner* — Jason Mandeville
(74) *Attorney, Agent, or Firm* — Lewis Roca Rothgerber Christie LLP

(57) ABSTRACT

A system and method for providing a 3D gesture based user interface with haptic feedback is disclosed. A processing system providing the 3D system provides haptic feedback by capturing image data. A gesture is then detected. The detected gesture is then used to determine an appropriate haptic feedback is determined. A signal that indicates the appropriate haptic feedback is generated and provided to a haptic feedback device. The haptic feedback devices then provides the appropriate haptic feedback.

25 Claims, 15 Drawing Sheets

(56) References Cited

U.S. PATENT DOCUMENTS

| | | |
|---|---|---|
| 6,834,120 B1 | 12/2004 | LeClerc et al. |
| 6,876,775 B2 | 4/2005 | Torunoglu |
| 6,906,793 B2 | 6/2005 | Bamji et al. |
| 6,919,549 B2 | 7/2005 | Bamji et al. |
| 7,006,236 B2 | 2/2006 | Tomasi et al. |
| 7,038,659 B2 | 5/2006 | Rajkowski |
| 7,050,177 B2 | 5/2006 | Tomasi et al. |
| 7,151,530 B2 | 12/2006 | Roeber et al. |
| 7,157,685 B2 | 1/2007 | Bamji et al. |
| 7,173,230 B2 | 2/2007 | Charbon |
| 7,176,438 B2 | 2/2007 | Bamji et al. |
| 7,203,356 B2 | 4/2007 | Gokturk et al. |
| 7,212,663 B2 | 5/2007 | Tomasi |
| 7,227,526 B2* | 6/2007 | Hildreth et al. ............. 345/156 |
| 7,283,213 B2 | 10/2007 | O'Connor et al. |
| 7,295,904 B2* | 11/2007 | Kanevsky ............. B60K 35/00 345/173 |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,433,029 B1 | 10/2008 | Hsu |
| 7,450,220 B2 | 11/2008 | O'Connor et al. |
| 7,464,351 B2 | 12/2008 | Bamji et al. |
| 7,471,376 B2 | 12/2008 | Bamji et al. |
| 7,507,947 B2 | 3/2009 | Bamji et al. |
| 7,511,801 B1 | 3/2009 | Rafii et al. |
| 7,526,120 B2 | 4/2009 | Gokturk et al. |
| 7,636,150 B1 | 12/2009 | McCauley et al. |
| 7,653,833 B1 | 1/2010 | Miller et al. |
| 7,653,883 B2 | 1/2010 | Hotelling et al. |
| 7,665,041 B2 | 2/2010 | Wilson et al. |
| 7,719,662 B2 | 5/2010 | Bamji et al. |
| 7,741,961 B1 | 6/2010 | Rafii et al. |
| 7,791,715 B1 | 9/2010 | Bamji |
| 7,805,003 B1 | 9/2010 | Cohen et al. |
| 7,877,707 B2 | 1/2011 | Westerman et al. |
| 7,936,449 B1 | 5/2011 | Bamji et al. |
| 7,994,465 B1 | 8/2011 | Bamji et al. |
| 8,009,871 B2 | 8/2011 | Rafii et al. |
| D645,493 S | 9/2011 | Zhao |
| 8,086,971 B2 | 12/2011 | Radivojevic et al. |
| 8,134,637 B2 | 3/2012 | Rossbach |
| 8,139,141 B2 | 3/2012 | Bamji et al. |
| 8,139,142 B2 | 3/2012 | Bamji et al. |
| 8,179,604 B1 | 5/2012 | Prada Gomez et al. |
| 8,180,114 B2 | 5/2012 | Nishihara et al. |
| 8,194,233 B2 | 6/2012 | Bamji |
| 8,203,699 B2 | 6/2012 | Bamji et al. |
| 8,212,859 B2 | 7/2012 | Tang et al. |
| 8,232,990 B2 | 7/2012 | King et al. |
| 8,265,350 B2 | 9/2012 | Torii et al. |
| 8,314,924 B2 | 11/2012 | Bamji et al. |
| 8,339,359 B2 | 12/2012 | Hsieh et al. |
| 8,363,212 B2 | 1/2013 | Bamji et al. |
| 8,368,795 B2 | 2/2013 | Lo et al. |
| 8,462,132 B2 | 6/2013 | Ren et al. |
| 8,525,876 B2 | 9/2013 | Fan et al. |
| 8,587,773 B2 | 11/2013 | Bamji et al. |
| 8,589,033 B2 | 11/2013 | Rafii et al. |
| 8,615,108 B1* | 12/2013 | Stoppa ............. G06K 9/00355 382/103 |
| 8,655,021 B2 | 2/2014 | Dal Mutto et al. |
| 8,675,182 B2 | 3/2014 | Bamji |
| 8,681,124 B2 | 3/2014 | Bamji et al. |
| 8,686,943 B1 | 4/2014 | Rafii |
| 8,693,724 B2 | 4/2014 | Ahmed et al. |
| 8,830,312 B2 | 9/2014 | Hummel et al. |
| 8,836,768 B1 | 9/2014 | Rafii et al. |
| 8,840,466 B2 | 9/2014 | Kareemi et al. |
| 9,092,953 B1* | 7/2015 | Mortimer ............. G06F 3/016 |
| 9,229,534 B2* | 1/2016 | Galor ............. G06F 3/017 |
| 2002/0112095 A1 | 8/2002 | Ford et al. |
| 2002/0140633 A1 | 10/2002 | Rafii et al. |
| 2003/0021032 A1 | 1/2003 | Bamji et al. |
| 2003/0132921 A1 | 7/2003 | Torunoglu et al. |
| 2003/0132950 A1 | 7/2003 | Surucu et al. |
| 2003/0165048 A1 | 9/2003 | Bamji et al. |
| 2003/0169906 A1 | 9/2003 | Gokturk et al. |
| 2003/0174125 A1 | 9/2003 | Torunoglu et al. |
| 2004/0046744 A1 | 3/2004 | Rafii et al. |
| 2004/0066500 A1 | 4/2004 | Gokturk et al. |
| 2004/0170323 A1 | 9/2004 | Cootes et al. |
| 2005/0134853 A1 | 6/2005 | Ingleson et al. |
| 2005/0271279 A1 | 12/2005 | Fujimura et al. |
| 2006/0047386 A1* | 3/2006 | Kanevsky ............. B60K 35/00 701/36 |
| 2006/0197753 A1 | 9/2006 | Hotelling |
| 2006/0241371 A1 | 10/2006 | Rafii et al. |
| 2006/0272436 A1 | 12/2006 | Lein et al. |
| 2007/0057946 A1 | 3/2007 | Albeck et al. |
| 2008/0120577 A1 | 5/2008 | Ma et al. |
| 2008/0122799 A1* | 5/2008 | Pryor ............. G06F 3/0312 345/173 |
| 2008/0170776 A1* | 7/2008 | Albertson ............. G06F 21/35 382/154 |
| 2008/0281523 A1 | 11/2008 | Dahl et al. |
| 2009/0021489 A1 | 1/2009 | Westerman et al. |
| 2009/0077161 A1 | 3/2009 | Hamilton, II et al. |
| 2009/0079813 A1 | 3/2009 | Hildreth |
| 2009/0096746 A1* | 4/2009 | Kruse et al. ............. 345/156 |
| 2009/0103780 A1 | 4/2009 | Nishihara et al. |
| 2009/0110301 A1 | 4/2009 | Schopp et al. |
| 2009/0153671 A1 | 6/2009 | Lee et al. |
| 2009/0183125 A1 | 7/2009 | Magal et al. |
| 2009/0290811 A1 | 11/2009 | Imai |
| 2009/0307658 A1 | 12/2009 | Freitas et al. |
| 2010/0027845 A1 | 2/2010 | Kim et al. |
| 2010/0027846 A1 | 2/2010 | Xu et al. |
| 2010/0027892 A1 | 2/2010 | Guan et al. |
| 2010/0053151 A1 | 3/2010 | Marti et al. |
| 2010/0110384 A1 | 5/2010 | Maekawa |
| 2010/0124949 A1 | 5/2010 | Demuynck et al. |
| 2010/0156676 A1 | 6/2010 | Mooring et al. |
| 2010/0192109 A1 | 7/2010 | Westerman et al. |
| 2010/0199228 A1 | 8/2010 | Latta et al. |
| 2010/0202663 A1 | 8/2010 | Kim et al. |
| 2010/0208038 A1 | 8/2010 | Kutliroff et al. |
| 2010/0211920 A1 | 8/2010 | Westerman et al. |
| 2010/0229125 A1 | 9/2010 | Cha |
| 2010/0235786 A1 | 9/2010 | Maizels et al. |
| 2010/0265316 A1 | 10/2010 | Sali et al. |
| 2010/0277411 A1* | 11/2010 | Yee ............. G06F 3/017 345/156 |
| 2010/0284082 A1 | 11/2010 | Shpunt et al. |
| 2010/0296368 A1 | 11/2010 | Dahl et al. |
| 2010/0306714 A1 | 12/2010 | Latta et al. |
| 2010/0321389 A1 | 12/2010 | Gay et al. |
| 2010/0329511 A1 | 12/2010 | Yoon et al. |
| 2011/0025827 A1 | 2/2011 | Shpunt et al. |
| 2011/0052006 A1 | 3/2011 | Gurman et al. |
| 2011/0069389 A1 | 3/2011 | Shpunt |
| 2011/0075259 A1 | 3/2011 | Shpunt |
| 2011/0096954 A1 | 4/2011 | Dahl |
| 2011/0103448 A1 | 5/2011 | Dahl et al. |
| 2011/0114857 A1 | 5/2011 | Akerman et al. |
| 2011/0115892 A1 | 5/2011 | Fan et al. |
| 2011/0134036 A1 | 6/2011 | Suggs |
| 2011/0134114 A1 | 6/2011 | Rais et al. |
| 2011/0148798 A1 | 6/2011 | Dahl |
| 2011/0149044 A1 | 6/2011 | Snin |
| 2011/0158508 A1 | 6/2011 | Shpunt et al. |
| 2011/0173574 A1 | 7/2011 | Clavin et al. |
| 2011/0187878 A1 | 8/2011 | Mor et al. |
| 2011/0188054 A1 | 8/2011 | Petronius et al. |
| 2011/0193939 A1* | 8/2011 | Vassigh ............. G06F 3/011 348/46 |
| 2011/0197161 A1 | 8/2011 | Mattingly et al. |
| 2011/0205421 A1 | 8/2011 | Shpunt et al. |

(56) References Cited

U.S. PATENT DOCUMENTS

| | | |
|---|---|---|
| 2011/0210931 A1* | 9/2011 | Shai .................... 345/173 |
| 2011/0211044 A1 | 9/2011 | Shpunt et al. |
| 2011/0211754 A1 | 9/2011 | Litvak et al. |
| 2011/0219340 A1 | 9/2011 | Pathangay et al. |
| 2011/0222726 A1 | 9/2011 | Ruan |
| 2011/0243380 A1 | 10/2011 | Forutanpour et al. |
| 2011/0254762 A1 | 10/2011 | Dahl et al. |
| 2011/0254765 A1 | 10/2011 | Brand |
| 2011/0262006 A1 | 10/2011 | Nakano |
| 2011/0274357 A1 | 11/2011 | Iwamoto et al. |
| 2011/0286673 A1 | 11/2011 | Givon et al. |
| 2011/0289455 A1 | 11/2011 | Reville et al. |
| 2011/0291925 A1 | 12/2011 | Israel et al. |
| 2011/0291926 A1 | 12/2011 | Gokturk et al. |
| 2011/0291988 A1 | 12/2011 | Bamji et al. |
| 2011/0292036 A1 | 12/2011 | Sali et al. |
| 2011/0292181 A1 | 12/2011 | Acharya et al. |
| 2011/0292370 A1 | 12/2011 | Hills et al. |
| 2011/0292380 A1 | 12/2011 | Bamji |
| 2011/0293137 A1 | 12/2011 | Gurman et al. |
| 2011/0294574 A1 | 12/2011 | Yamada et al. |
| 2011/0295562 A1 | 12/2011 | Mehta et al. |
| 2011/0296353 A1* | 12/2011 | Ahmed et al. .................. 715/848 |
| 2011/0298704 A1 | 12/2011 | Krah |
| 2011/0300929 A1 | 12/2011 | Tardif et al. |
| 2011/0310010 A1 | 12/2011 | Hoffnung et al. |
| 2011/0310125 A1 | 12/2011 | McEldowney et al. |
| 2012/0011454 A1 | 1/2012 | Droz et al. |
| 2012/0027252 A1 | 2/2012 | Liu et al. |
| 2012/0038986 A1 | 2/2012 | Pesach |
| 2012/0042150 A1 | 2/2012 | Saar |
| 2012/0042246 A1 | 2/2012 | Schwesinger |
| 2012/0050488 A1 | 3/2012 | Cohen et al. |
| 2012/0051605 A1 | 3/2012 | Nagar et al. |
| 2012/0070070 A1 | 3/2012 | Litvak |
| 2012/0078614 A1 | 3/2012 | Galor et al. |
| 2012/0092304 A1 | 4/2012 | Katz |
| 2012/0099403 A1 | 4/2012 | Dahl et al. |
| 2012/0106792 A1 | 5/2012 | Kang et al. |
| 2012/0127070 A1* | 5/2012 | Ryoo et al. .................. 345/156 |
| 2012/0140094 A1 | 6/2012 | Shpunt et al. |
| 2012/0140109 A1 | 6/2012 | Shpunt et al. |
| 2012/0151339 A1* | 6/2012 | Zhang .................... G06F 3/016 715/702 |
| 2012/0169583 A1 | 7/2012 | Rippel et al. |
| 2012/0169671 A1 | 7/2012 | Yasutake |
| 2012/0176414 A1 | 7/2012 | Givon |
| 2012/0182464 A1 | 7/2012 | Shpunt et al. |
| 2012/0202569 A1 | 8/2012 | Maizels et al. |
| 2012/0204133 A1 | 8/2012 | Guendelman et al. |
| 2012/0206339 A1 | 8/2012 | Dahl |
| 2012/0218183 A1 | 8/2012 | Givon et al. |
| 2012/0223882 A1 | 9/2012 | Galor et al. |
| 2012/0243374 A1 | 9/2012 | Dahl et al. |
| 2012/0249744 A1 | 10/2012 | Pesach et al. |
| 2012/0268364 A1 | 10/2012 | Minnen |
| 2012/0270653 A1 | 10/2012 | Kareemi et al. |
| 2012/0274550 A1 | 11/2012 | Campbell et al. |
| 2012/0274610 A1 | 11/2012 | Dahl |
| 2012/0281240 A1 | 11/2012 | Cohen et al. |
| 2012/0299820 A1 | 11/2012 | Dahl |
| 2012/0304067 A1 | 11/2012 | Han et al. |
| 2012/0306876 A1 | 12/2012 | Shotton et al. |
| 2012/0313848 A1 | 12/2012 | Galor et al. |
| 2012/0313900 A1 | 12/2012 | Dahl |
| 2012/0327125 A1 | 12/2012 | Kutliroff et al. |
| 2013/0014052 A1 | 1/2013 | Frey et al. |
| 2013/0038601 A1 | 2/2013 | Han et al. |
| 2013/0038881 A1 | 2/2013 | Pesach et al. |
| 2013/0038941 A1 | 2/2013 | Pesach et al. |
| 2013/0044053 A1 | 2/2013 | Galor et al. |
| 2013/0050080 A1 | 2/2013 | Dahl et al. |
| 2013/0055120 A1 | 2/2013 | Galor et al. |
| 2013/0055143 A1 | 2/2013 | Martin et al. |
| 2013/0055150 A1 | 2/2013 | Galor |
| 2013/0057654 A1 | 3/2013 | Rafii et al. |
| 2013/0063487 A1 | 3/2013 | Spiegel et al. |
| 2013/0069876 A1 | 3/2013 | Cheng et al. |
| 2013/0094329 A1 | 4/2013 | Dahl et al. |
| 2013/0106692 A1 | 5/2013 | Maizels et al. |
| 2013/0107021 A1 | 5/2013 | Maizels et al. |
| 2013/0135312 A1 | 5/2013 | Yang et al. |
| 2013/0147770 A1 | 6/2013 | Dahl et al. |
| 2013/0155031 A1 | 6/2013 | Dahl et al. |
| 2013/0162527 A1 | 6/2013 | Dahl |
| 2013/0176258 A1 | 7/2013 | Dahl et al. |
| 2013/0179034 A1 | 7/2013 | Pryor |
| 2013/0201316 A1 | 8/2013 | Binder et al. |
| 2013/0216094 A1 | 8/2013 | DeLean |
| 2013/0283213 A1* | 10/2013 | Guendelman .......... G06F 3/017 715/848 |
| 2013/0335573 A1 | 12/2013 | Forutanpour et al. |
| 2014/0020635 A1* | 1/2014 | Sayers .................. A01K 15/021 119/721 |
| 2014/0043598 A1 | 2/2014 | Bamji et al. |
| 2014/0173440 A1 | 6/2014 | Mutto et al. |
| 2014/0211991 A1 | 7/2014 | Stoppa et al. |
| 2014/0211992 A1 | 7/2014 | Stoppa et al. |
| 2014/0320408 A1* | 10/2014 | Zagorsek ............... G06F 3/017 345/158 |

FOREIGN PATENT DOCUMENTS

| | | |
|---|---|---|
| WO | 2006011153 A2 | 2/2006 |
| WO | 2007052262 A2 | 5/2007 |
| WO | 2006011153 A3 | 10/2008 |
| WO | 2008126069 A2 | 10/2008 |
| WO | 2007052262 A3 | 4/2009 |
| WO | 2008126069 A3 | 4/2009 |
| WO | 2009128064 A2 | 10/2009 |
| WO | 2009142443 A2 | 11/2009 |
| WO | 2009128064 A3 | 1/2010 |
| WO | 2010026587 A1 | 3/2010 |
| WO | 2010030296 A1 | 3/2010 |
| WO | 2010046901 A2 | 4/2010 |
| WO | 2010046901 A3 | 8/2010 |
| WO | 2010086866 A1 | 8/2010 |
| WO | 2010096279 A2 | 8/2010 |
| WO | 2010103482 A2 | 9/2010 |
| WO | 2010096279 A3 | 11/2010 |
| WO | 2010103482 A3 | 11/2010 |
| WO | 2011013079 A1 | 2/2011 |
| WO | 2011033519 A1 | 3/2011 |
| WO | 2011045789 A1 | 4/2011 |
| WO | 2012011044 A1 | 1/2012 |
| WO | 2012020380 A1 | 2/2012 |
| WO | 2012020410 A2 | 2/2012 |
| WO | 2012066501 A1 | 5/2012 |
| WO | 2012081012 A1 | 6/2012 |
| WO | 2012093394 A2 | 7/2012 |
| WO | 2012095756 A2 | 7/2012 |
| WO | 2012098534 A1 | 7/2012 |
| WO | 2012107892 A2 | 8/2012 |
| WO | 2012119633 A1 | 9/2012 |
| WO | 2012119885 A1 | 9/2012 |
| WO | 2012107892 A3 | 11/2012 |
| WO | 2012164562 A1 | 12/2012 |
| WO | 2013008236 A1 | 1/2013 |
| WO | 2013018099 A2 | 2/2013 |
| WO | 2013021385 A2 | 2/2013 |
| WO | 2012095756 A3 | 7/2013 |
| WO | 2014120554 A2 | 8/2014 |

OTHER PUBLICATIONS

"PointGrab Announces New Hand Gesture Control Solution for the Latest Premium Samsung Smart TV Models", Yahoo! Finance, Retrieved on Apr. 4, 2013, from http://www.finance.yahoo.com/news/pointgrab-announces-hand-gesture-control-22000959.html, 2 pgs.

Belaroussi, et al., "Comparison of Different Combination Strategies for Face Localization", Proceedings of the 2006 International Con-

(56) References Cited

OTHER PUBLICATIONS ference on Image Processing, Computer Vision, & Pattern Recognition, Las Vegas, Nevada, Jun. 26-29, 2006, pp. 383-389.

Canesta3D, "Canesta 3D ToF Sensor Demo for Living Room", Youtube, Oct. 28, 2010, Retrieved from: http://www.youtube.com/watch?v=TmKShSHOSYU.

Canesta3D, "Canesta PC demo video", Youtube, Oct. 25, 2010, Retrieved from: http://www.youtube.com/watch?v=I36Aqk1A6vY.

Canesta3D, "Canesta TV Gesture User Interface Demo", Youtube, May 29, 2009, Retrieved from: http://www.youtube.com/watch?v=uR27dPHI7dQ.

Canesta3D, "Canesta's latest 3D Sensor—"Cobra" . . . highest res CMOS 3D depth sensor in the world", Youtube, Oct. 25, 2010, Retrieved from: http://www.youtube.com/watch?v=5_PVx1NbUZQ.

Canesta3D, "Future of Remote Control", Youtube, Oct. 29, 2009, Retrieved from: http://www.youtube.com/watch?v=vnfdoDHiNil.

Canesta3D, "Point Cloud Demo, using Canesta's 320×200 3D Tof Image Sensor", Youtube, Oct. 28, 2010, Retrieved from: http://www.youtube.com/watch?v=4xIXsJuH74c.

Carmody, Tim, "Why 'Gorilla Arm Syndrome' Rules Out Multitouch Notebook Displays", Wired, Oct. 21, 2010, Retrieved from http://www.wired.com/gadgetlab/2010/10/gorilla-arm-multitouch/, 3 pgs.

Forsyth, "Computer Vision—A Modern Approach", Recognition as Template Matching, 46 pgs.

Hasan et al., "Real Time Fingers and Palm Locating using Dynamic Circle Templates", International Journal of Computer Applications, vol. 41, No. 6, Mar. 2012, pp. 33-43.

Kerdvibulvech et al., "Markerless Guitarist Fingertip Detection Using a Bayesian Classifier and a Template Matching for Supporting Guitarists", Proc. 10th Virtual Reality Int. Conf., Apr. 2008, 7 pgs.

Kolsch et al., "Flocks of Features for Tracking Articulated Objects", Retrieved from http://www.cs.ucsb.edu/~mturk/pubs/KolschBook05.pdf, pp. 1-18, Index.

Lin, John "Visual Hand Tracking and Gesture Analysis", Dissertation, University of Illinois at Urbana-Champaign, 2004, 116 pgs.

Murase et al., "Gesture Keyboard Requiring Only One Camera", ACM UIST'11, Oct. 16-19, 2011, Santa Barbara, CA, pp. 1-2.

Nosowitz, "The Second Wave of Gesture-Controlled TVs", Popular Science, Retrieved on Apr. 4, 2013, from: www.popsci.com/gadgets/article/2012-01/second-wave-gesture-controlled-tvs, 6 pgs.

Onishi et al., "3D Human Posture Estimation Using HOG Features of Monocular Images", Pattern Recognition, Peng-Yeng Yin (Ed.), Intech, DOI:10.5772/7541., Oct. 1, 2009, pp. 1-11.

Rautaray et al., "Vision Based Hand Gesture Recognition for Human Computer Interaction: A Survey", Artificial Intelligence Review, Springer, Nov. 6, 2012, 54 pgs.

Thayananthan, "Template-based Pose Estimation and Tracking of 3D Hand Motion", Dissertation, University of Cambridge, 2005, 172 pgs.

Zhang, Zhengyou, "Flexible Camera Calibration by Viewing a Plane From Unknown Orientations", Microsoft Research, Redmond, WA, 8 pgs.

* cited by examiner

VIBROTACTILE SYSTEM TO AUGMENT 3D INPUT SYSTEMS

CROSS-REFERENCE TO RELATED APPLICATIONS

The current application claims priority to U.S. Provisional Patent Application No. 61/860,872, filed Jul. 31, 2013, the disclosure of which is incorporated herein by reference.

FIELD OF THE INVENTION

This invention relates to three dimensional (3D) user interface systems. More specifically, this invention relates to providing haptic feedback to a user of a 3D user interface system.

BACKGROUND OF THE INVENTION

Operating systems can be found on almost any device that contains a computing system from cellular phones and video game consoles to supercomputers and web servers. A device's operating system (OS) is a collection of software that manages computer hardware resources and provides common services for user application programs. The OS typically acts as an interface between the hardware and the programs requesting input or output (I/O), CPU resources, and memory allocation. When an application executes on a computer system with an operating system, the application's code is usually executed directly by the hardware and can make system calls to the OS or be interrupted by it. The portion of the OS code that interacts directly with the computer hardware and implements services for applications is typically referred to as the kernel of the OS. The portion that interfaces with the applications and users is known as the shell. The user can interact with the shell using a variety of techniques including (but not limited to) using a command line interface or a graphical user interface (GUI).

Most modern computing devices support graphical user interfaces (GUI). GUIs are typically rendered using one or more interface objects. Actions in a GUI are usually performed through direct manipulation of graphical elements such as icons. In order to facilitate interaction, the GUI can incorporate one or more interface objects referred to as interaction elements that are visual indicators of user action or intent (such as a pointer), or affordances showing places where the user may interact. The term affordance here is used to refer to the fact that the interaction element suggests actions that can be performed by the user within the GUI.

A GUI typically uses a series of interface objects to represent in a consistent manner the ways in which a user can manipulate the information presented to the user via the user interface. In the context of traditional personal computers employing a keyboard and a pointing device, the most common combination of such objects in GUIs is the Window, Icon, Menu, Pointing Device (WIMP) paradigm. The WIMP style of interaction uses a virtual input device to control the position of a pointer, most often a mouse, trackball and/or trackpad and presents information organized in windows and/or tabs and represented with icons. Available commands are listed in menus, and actions can be performed by making gestures with the pointing device.

The term user experience is generally used to describe a person's emotions about using a product, system or service. With respect to user interface design, the ease with which a user can interact with the user interface is a significant component of the user experience of a user interacting with a system that incorporates the user interface. A user interface in which task completion is difficult due to an inability to accurately convey input to the user interface can lead to negative user experience, as can a user interface that rapidly leads to fatigue.

Touch interfaces, such as touch screen displays and trackpads, enable users to interact with GUIs via two dimensional (2D) gestures (i.e. gestures that contact the touch interface). The ability of the user to directly touch an interface object displayed on a touch screen can obviate the need to display a cursor. In addition, the limited screen size of most mobile devices has created a preference for applications that occupy the entire screen instead of being contained within windows. As such, most mobile devices that incorporate touch screen displays do not implement WIMP interfaces. Instead, mobile devices utilize GUIs that incorporate icons and menus and that rely heavily upon a touch screen user interface to enable users to identify the icons and menus with which they are interacting.

Multi-touch GUIs are capable of receiving and utilizing multiple temporally overlapping touch inputs from multiple fingers, styluses, and/or other such manipulators (as opposed to inputs from a single touch, single mouse, etc.). The use of a multi-touch GUI may enable the utilization of a broader range of touch-based inputs than a single-touch input device that cannot detect or interpret multiple temporally overlapping touches. Multi-touch inputs can be obtained in a variety of different ways including (but not limited to) via touch screen displays and/or via trackpads (pointing device).

In many GUIs, scrolling and zooming interactions are performed by interacting with interface objects that permit scrolling and zooming actions. Interface objects can be nested together such that one interface object (often referred to as the parent) contains a second interface object (referred to as the child). The behavior that is permitted when a user touches an interface object or points to the interface object is typically determined by the interface object and the requested behavior is typically performed on the nearest ancestor object that is capable of the behavior, unless an intermediate ancestor object specifies that the behavior is not permitted. The zooming and/or scrolling behavior of nested interface objects can also be chained. When a parent interface object is chained to a child interface object, the parent interface object will continue zooming or scrolling when a child interface object's zooming or scrolling limit is reached.

The evolution of 2D touch interactions has led to the emergence of 3D user interfaces that are capable of 3D interactions. A variety of machine vision techniques have been developed to perform three dimensional (3D) gesture detection using image data captured by one or more digital cameras (RGB and/or IR), or one or more 3D sensors such as time-of-flight cameras, and structured light cameras. Detected gestures can be static (i.e. a user placing her or his hand in a specific pose) or dynamic (i.e. a user transition her or his hand through a prescribed sequence of poses). Based upon changes in the pose of the human hand and/or changes in the pose of a part of the human hand over time, the image processing system can detect dynamic gestures.

SUMMARY OF THE INVENTION

An advance in the art is made by a vibrotactile system to augment a 3D input system in accordance with embodiments of this invention. In accordance with embodiments of this invention, an image processing system configured to conduct 3D gesture based interactive sessions that provides haptic feedback includes a memory containing an image processing application and a processor. An image processing application stored in the memory configures to processor to determine a haptic response and signal a haptic device to provide the haptic device to provide the determined response in the following manner. The processor receives image data of a target object. The captured image data is used to detect a 3D gesture in the image data. A haptic feedback response is determined based upon the detected 3D gesture. A haptic response signal that indicates the determined haptic feedback response is generated and provided to a haptic feedback device.

In accordance with embodiments of this invention a spatial position of the target object in a 3D interaction zone may also be determined. In accordance with these embodiments, the determination of the haptic feedback response is determined by the spatial position of the target object.

In accordance with some embodiments of this invention, the spatial position of the target object is used to determine that the target object is proximate a boundary of the 3D interaction zone and the haptic feedback is an indication that the target object is proximate the boundary. In accordance with some of these embodiments, the 3D interaction zone is determined based upon motions of the target object. In accordance with some of these embodiments, the 3D interaction zone is defined based upon the motions of the target object during an initialization gesture. In accordance with some of embodiments, a size of the 3D interaction zone is determined based upon a scale of at least one of a plurality of templates that matches a part of the target object visible in a sequence of frames of video data captured during detection of an initialization gesture and a distance of the part of the target object visible in the sequence of frames of video data from the camera used to capture the sequence of frames of video data. In accordance with some of these embodiments, a size of the 3D interaction zone is determined based upon a region in 3D space in which motion of the target object is observed during the initialization gesture. In accordance with some of these embodiments, the 3D interaction zone is a predetermined size determined based upon human physiology.

In accordance with some embodiments, the 3D gesture detected is a pointing gesture that is interacting with a gesture responsive interface object. In accordance with some embodiments, the 3D gesture detected is a pointing gesture that is interacting with an affordance. In accordance with some embodiments, an interactive response to the detected 3D gesture is determined and the haptic feedback response is determined based upon the interactive response. In accordance with some of these embodiments, the interactive response to the detected 3D gesture is an interaction with a gesture reactive interface object. In accordance with some of these embodiments, the detected 3D gesture targets a gesture reactive interface object and the interactive response is to unlock a new set of 3D gestures. In accordance with some embodiments, the detected 3D gesture is a tapping motion and the interactive response is interacting with a gesture response interface object. In accordance with some of these embodiments, the detected 3D gesture is a pointing motion, the interactive response is a tap and the determined haptic feedback is a specific vibration that simulates the sense of tapping on a surface. In accordance with some embodiments, the detected 3D gesture is a movement along a substantially vertical axis, the interactive response is determined to be a scrolling action and the haptic feedback response is a specific vibration that simulates the sense of moving a finger through an interior surface of a pipe. In accordance with some embodiments, the detected 3D gesture is a movement along a substantially horizontal axis, the interactive response is determined to be a scrubbing action and the haptic feedback response is a specific vibration that simulates that simulates the sense of rubbing a finger across a surface.

In accordance with some embodiments the haptic response signal is provided to the haptic feedback device by transmitting the haptic response signal to the haptic feedback device via a wireless connection. In accordance with some embodiments, the haptic response signal is provided to the haptic feedback device via a haptic feedback device interface.

In accordance with some embodiments, the haptic feedback device is a vibrotactile ring. In accordance with some of these embodiments, the vibrotactile ring includes vibrating motors situated around a circumference of the vibrotactile ring. A controller in the ring is configured to receive the haptic response signal and generate signals that selectively drive each of the vibrating motors to generate the determined haptic response. In accordance with some of these embodiments, the controller generates specific signals to drive each of the plurality of vibrating motors to provide a specific vibration pattern as the haptic response. In accordance with some of these embodiments, the processor is configured to provide the haptic response signal via a wireless connection to the vibrotactile ring and the vibrotactile ring further comprises a wireless receiver that receives the haptic response signal via the wireless connection and provides the haptic response signal to the controller. In accordance with some of these embodiments, the processor is configured to detect a hand pose associated with the 3D gesture in the captured image data and determine the orientation of the vibrotactile ring relative to a 3D interaction zone based upon the hand pose, and generate a haptic response signal based upon the orientation of the vibrotactile ring relative to the 3D interaction zone.

DETAILED DISCLOSURE OF THE INVENTION

Turning now to the drawings, a 3D user interface that couples to a wearable device configured to provide haptic feedback/guidance is described. For purposes of this discussion, the terms 3D user interface, 3D gesture based user interface, Natural User Interface (NUI) are used interchangeably through this description to describe a system that captures images of a user and determines when certain 3D gestures are made that indicate specific interactions with the user interface. The present disclosure describes a 3D user interface system that senses the position of a hand, finger(s), any other body part(s), and/or an arbitrary object; correlates the position information to the display context; and transmits a pre-defined vibration pattern to a wearable haptic feedback device. The haptic feedback device may or may not be in contact with the user's skin to stimulate the user's sense of touch and/or provide haptic guidance to the user in order to augment the 3D gesture based user interface experience.

Real-Time Gesture Based Interactive Systems

Figure 1:
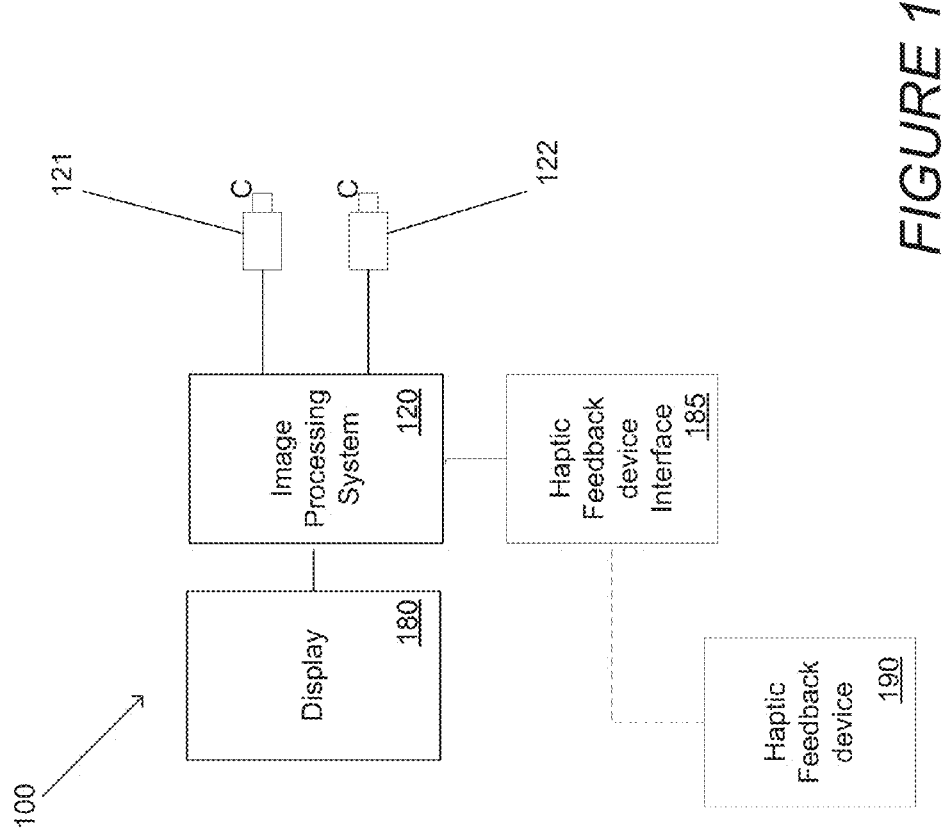
FIG. 1 illustrates a high level block diagram of a system configured to perform real time tracking of human hands and provide a 3D gesture based user interface including haptic feedback in accordance with embodiments of this invention.

A real-time gesture based interactive system in accordance with an embodiment of the invention is illustrated in FIG. 1. The real-time gesture based interactive system 100 includes an image processing system 120 configured to receive image data captured by at least one camera 121-122. In accordance with many embodiments, the real-time gesture based interactive system 100 processes the captured image data to determine the location and pose of a human hand. Object detection of human hands can be challenging due to the fact that hands typically have very low texture and are not rigid. In accordance with several embodiments, the real-time gesture based interactive system uses a parts based template matching process to detect individual fingers from which a hand pose can be inferred in the manner outlined in U.S. patent application Ser. No. 13/899,536. In accordance with other embodiments, any of a variety of hand and/or finger tracking techniques can be utilized as appropriate to the requirements of a specific application. Although much of the discussion that follows focuses on 3D gestures made using human hands and human fingers, motion of any of a variety of objects in a predetermined manner can be utilized to perform gesture based interaction with a user interface in accordance with embodiments of the invention.

Based upon the location and pose of a detected human hand, the image processing system 120 can detect 3D gestures including (but not limited to) an initialization gesture indicating that the user is commencing gesture based interaction with the system and gestures that indicate the user's intention to interact with a specific interface object within the user interface. 3D gestures can be static (i.e. a user placing her or his hand in a specific pose) or dynamic (i.e. a user transition her or his hand through a prescribed sequence of poses). Based upon changes in the pose of the human hand and/or changes in the pose of a part of the human hand over time, the image processing system can detect dynamic gestures. In a number of embodiments, the real-time gesture based interactive system 100 includes a display 180 via which the real-time gesture based interactive system can present a user interface incorporating gesture reactive interface objects to the user. As noted above, the presentation of gesture reactive interface objects and/or the manner in which a user can interact with the interface objects changes as a reaction or in response to the 3D gesture input provided by the user. 3D gesture based user interfaces that incorporate gesture reactive interface objects are disclosed in U.S. patent application Ser. No. 13/965,157 entitled "Systems and Methods for Implementing Three-Dimensional (3D) Gesture Based Graphical User Interfaces (GUI) that Incorporate Gesture Reactive Interface Objects", filed Aug. 12, 2013, the disclosure of which is hereby incorporated by reference in its entirety.

In accordance with many embodiments, the manner in which a gesture reactive interface object is displayed within the user interface and/or the size of the target zone associated with the interface object is determined based on a variety of factors including (but not limited to) the distance of the user from the display, the location of the display, the size of the display, the resolution of the display, the displayed content, the provider of the displayed content, and/or user-tunable factors. In accordance with other embodiments, the manner in which the gesture reactive interface object is displayed and/or the interactions permitted by the interface object are modified when a user targets the interface object via a 3D gesture. In the context of a real-time gesture based interactive system in accordance with many embodiments of the invention, the concept of targeting an interface object is separate from the concept of selecting the interface object. A 3D gesture that targets an interface object is a 3D gesture that (like a pointing device) points a cursor at an interface object, but does not select the interface object. In accordance with many embodiments, a selection process is utilized in which an object is targeted by a first targeting 3D gesture, the user interface is modified to inform the user that the object is selectable and/or the time remaining in which the interface object is selectable, and the selection process is completed using a separate second selection 3D gesture. In this way, the user interface is not simply providing a user experience that treats 3D gestures as another form of pointer input, such as the input that would be received via a mouse or a trackpad. Instead, gesture reactive interface objects respond to 3D gestures in a way that provides a user experience in which the process of selecting interface objects is easier and less tiring to complete.

In accordance with many embodiments of this invention, the real-time gesture based interactive system 100 also includes a haptic feedback device 190 and a haptic feedback device interface 185. The interactive system can continuously monitor user input received via 3D gestures and provide haptic feedback (where appropriate) to assist the user when interacting with the 3D gesture based user interface. A signal is then generated by the image processing system 120 that indicates the type of haptic feedback to provide to the user. The signal is provided by the image processing system 120 to a haptic feedback device interface 185. The haptic feedback device interface 185 then provides the signal to the haptic feedback device 190 to generate the signaled haptic feedback.

Although a specific real-time gesture based interactive system including two cameras is illustrated in FIG. 1, any of a variety of real-time gesture based interactive systems configured to capture image data from at least one view can be utilized as appropriate to the requirements of specific applications in accordance with embodiments of the invention. Image processing systems in accordance with embodiments of the invention are discussed further below.

Image Processing System

Figure 2:
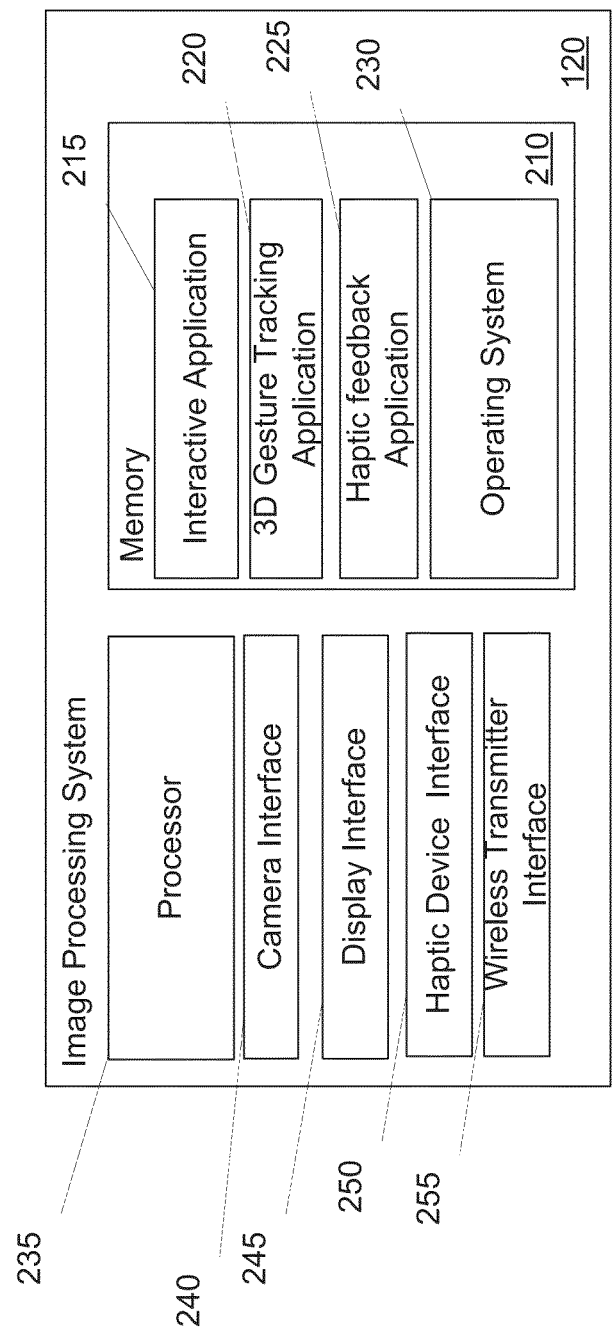
FIG. 2 illustrates a high level block diagram of an image processing system in accordance with embodiments of this invention.

Image processing systems in accordance with many embodiments of the invention can be implemented using a variety of software configurable computing devices including (but not limited to) personal computers, tablet computers, smart phones, embedded devices, Internet devices, wearable devices, and consumer electronics devices such as (but not limited to) televisions, projectors, disc players, set top boxes, glasses, watches, and game consoles. An image processing system in accordance with an embodiment of the invention is illustrated in FIG. 2. The image processing system 120 includes a processor 235 that is configured to communicate with a camera interface 240, a display interface 245, a haptic feedback device interface 250, and/or wireless transmitter interface 255.

The image processing system 120 also includes memory 210 which can take the form of one or more different types of storage including semiconductor and/or disk based storage. In accordance with the illustrated embodiment, the processor 235 is configured using an operating system 230. Where the image processing system is part of an embedded system, the image processing system may not utilize an operating system. Referring back to FIG. 2, the memory 210 also includes a 3D gesture tracking application 220, an interactive application 215, and a haptic feedback application 225.

The 3D gesture tracking application 220 processes image data received via the camera interface 240 to identify 3D gestures such as hand gestures including initialization gestures and/or the orientation and distance of individual fingers. These 3D gestures can be processed by the processor 235, which can detect an initialization gesture and initiate an initialization process that can involve defining a 3D interaction zone in which a user can provide 3D gesture input to the image processing system. Following the completion of the initialization process, the processor can commence tracking 3D gestures that enable the user to interact with a user interface generated by the operating system 230 and/or the interactive application 225.

Based on the gestures identified by the 3D gesture tracking application, the haptic feedback application 225 generates signals that are provided to a haptic feedback device to provide haptic feedback to the user. The signals may include (but are not limited to) signals that indicate the initialization process is complete, signals that indicate that the hand is moving outside the 3D interaction zone, signals indicating that a function is being performed, and other signals that provide haptic feedback based upon detected gestures.

In accordance with many embodiments, the interactive application 215 and the operating system 230 configure the processor 235 to generate and render an initial user interface using a set of interface objects. The interface objects can be modified in response to a detected interaction with a targeted interface object and an updated user interface rendered. Targeting and interaction with interface objects can be performed via a 3D gesture based input modality using the 3D gesture tracking application 220. In accordance with several embodiments, the 3D gesture tracking application 220 and the operating system 230 configure the processor 235 to capture image data using an image capture system via the camera interface 24, and detect a targeting 3D gesture in the captured image data that identifies a targeted interface object within a user interface. The processor 235 can also be configured to then detect a 3D gesture in captured image data that identifies a specific interaction with the targeted interface object. Based upon the detected 3D gesture, the 3D gesture tracking application 220 and/or the operating system 230 can then provide an event corresponding to the appropriate interaction with the targeted interface objects to the interactive application to enable it to update the user interface in an appropriate manner. In addition, the haptic feedback application 245 can use an identified 3D gesture to determine an appropriate haptic feedback (if any) to provide in response to the identified 3D gesture and generate a signal for the feedback to send to the haptic feedback device. Although specific techniques for configuring an image processing system using an operating system, a 3D gesture tracking application, an interactive application, and haptic feedback application are described above with reference to FIG. 2, any of a variety of processes can be performed by similar applications and/or by the operating system in different combinations as appropriate to the requirements of specific image processing systems in accordance with embodiments of the invention.

In accordance with many embodiments, the processor receives frames of video via the camera interface 245 from at least one camera or other type of image capture device. The camera interface can be any of a variety of interfaces appropriate to the requirements of a specific application including (but not limited to) the USB 2.0 or 3.0 interface standards specified by USB-IF, Inc. of Beaverton, Oreg., and the MIPI-CSI2 interface specified by the MIPI Alliance. In accordance with a number of embodiments, the received frames of video include image data represented using the RGB color model represented as intensity values in three color channels. In accordance with several embodiments, the received frames of video data include monochrome image data represented using intensity values in a single color channel. In accordance with several embodiments, the image data represents visible light. In accordance with other embodiments, the image data represents intensity of light in non-visible portions of the spectrum including (but not limited to) the infrared, near-infrared, and ultraviolet portions of the spectrum. In certain embodiments, the image data can be generated based upon electrical signals derived from other sources including but not limited to ultrasound signals. In several embodiments, the received frames of video are compressed using the Motion JPEG video format (ISO/IEC JTC1/SC29/WG10) specified by the Joint Photographic Experts Group. In a number of embodiments, the frames of video data are encoded using a block based video encoding scheme such as (but not limited to) the H.264/

MPEG-4 Part 10 (Advanced Video Coding) standard jointly developed by the ITU-T Video Coding Experts Group (VCEG) together with the ISO/IEC JTC1 Motion Picture Experts Group. In certain embodiments, the image processing system receives RAW image data. In several embodiments, the camera systems that capture the image data also include the capability to capture dense depth maps and the image processing system is configured to utilize the dense depth maps in processing the image data received from the at least one camera system. In several embodiments, the camera systems include 3D sensors that capture dense depth maps including (but not limited to) time-of-flight camera.

In accordance with many embodiments, the display interface 250 is utilized to drive a display device that can be integrated within the image processing system and/or external to the image processing system. In a number of embodiments, the HDMI High Definition Multimedia Interface specified by HDMI Licensing, LLC of Sunnyvale, Calif. is utilized to interface with the display device. In other embodiments, any of a variety of display interfaces appropriate to the requirements of a specific application can be utilized.

In accordance with embodiments, the haptic feedback device interface can be any of a variety of interfaces appropriate to the requirements of a specific application including (but not limited to) the USB 2.0 or 3.0 interface standards specified by USB-IF, Inc. of Beaverton, Oreg., and the MIPI-CSI2 interface specified by the MIPI Alliance. In accordance with some embodiments, the haptic feedback device interface includes any of a variety of interfaces appropriate to the requirements of a particular haptic feedback device.

In accordance with many embodiments, the wireless transmitter interface can be any of a variety of appropriate interfaces for communication with another device such as, but not limited to Bluetooth®. In accordance with certain embodiments, the wireless transmitter interface allows communication with a haptic feedback device via a wireless communication.

Although a specific image processing system is illustrated in FIG. 2, any of a variety of image processing system architectures capable of gathering information for performing real-time hand tracking, updating a displayed user interface in response to detected 3D gestures, and provide haptic feedback based on the detected 3D gestures can be utilized in accordance with embodiments of the invention. Processes for providing haptic feedback in response to the detection of 3D gesture inputs in accordance with embodiments of the invention are discussed further below.

Haptic Feedback Device

Figure 3:
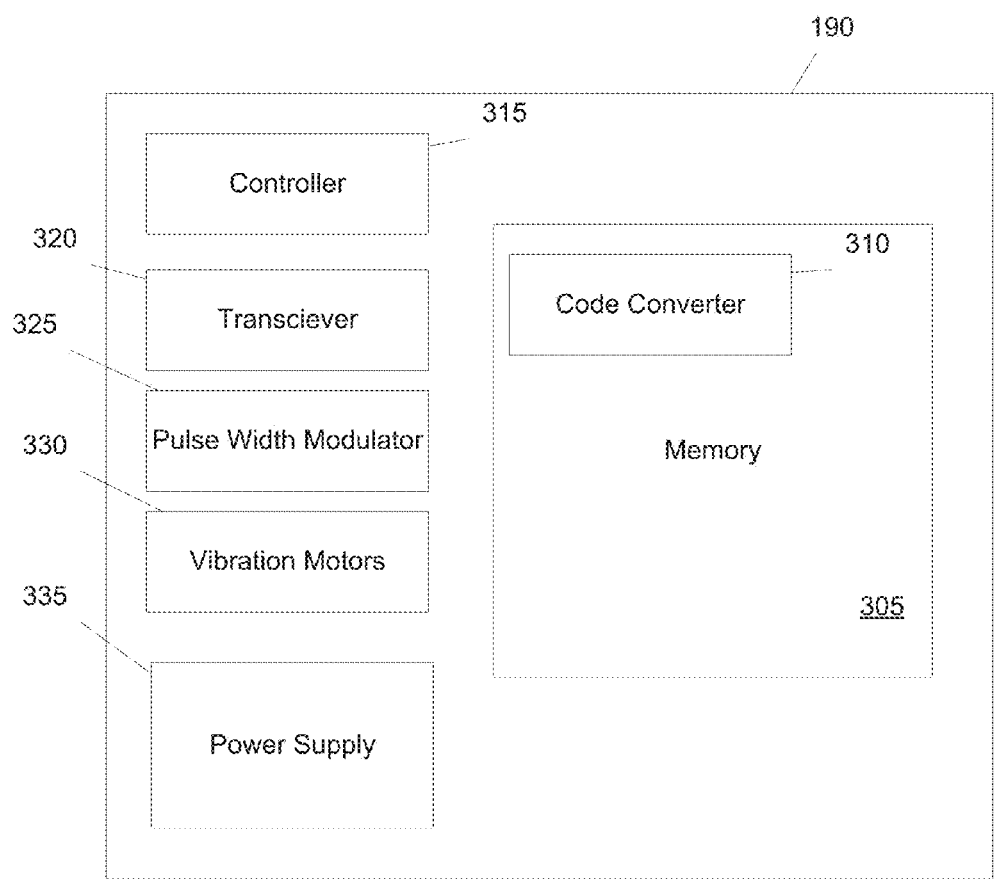
FIG. 3 illustrates a high level block diagram of a user worn haptic feedback device in accordance with embodiments of this invention.

In accordance with some embodiments of this invention, the haptic feedback device 190 may be a ring, glove, watch or other article that is worn by the user and includes one or more vibration motors that vibrate to generate haptic feedback that is communicatively connected to the device that includes the image processing system. In accordance with some other embodiments of this invention, the haptic feedback device 190 may be embedded in the device that includes the image processing systems. Some examples of such systems, include but are not limited to, laptops, desktops, smart phones or similar devices. The components of a haptic feedback device 190 in accordance with embodiments of this invention are shown in FIG. 3. The haptic feedback device 190 includes a controller 315, a transceiver 320, a pulse width modulator 325, vibration motors 330, a power supply 335 and a memory 305. Controller 315 is a controller, microcontroller or other processing device that is configured by instructions in memory 305 to control the application of vibrations by the vibration motors in response to signals received by the image processing system. Memory 305 stores the instructions for configuring controller 315 and includes a code convertor 310 that indicates the vibrations to apply based upon signals received from the image processing system.

The transceiver 320 is a component that allows the controller 315 to receive and send signals to and from other processing systems in accordance with some embodiments of this invention. In accordance with many embodiments, the transceiver receives wireless signals from and may transmit wireless signals to the image processing system. The wireless signals may by IR signals, RF signals, or any other type of wireless signal that may be used to communicate between processing devices.

A Pulse Width Modulator is in communication with controller 315 and is controlled by controller 315 to generate signals applied to vibration motors 330 to provide the desired haptic feedback. Vibration motors 330 are one or more electro-mechanical devices that vibrate or provide some other stimuli based upon signals received from the pulse width modulator to provide the desired haptic feedback to the user. Power supply 335 is a battery or other supply of electricity used to power the various components of haptic feedback device 190.

Although specific haptic feedback devices in accordance with embodiments of the invention are described above with reference to FIG. 3, any of a variety of devices can be utilized to provide haptic feedback as appropriate to the requirements of specific applications in accordance with embodiments. Various haptic feedback devices including vibrotactile rings that can be utilized to provide haptic feedback responses to 3D gesture based inputs to a 3D gesture based user interface in accordance with embodiments of the invention are discussed further below.

Vibrotactile Ring

Figure 4:
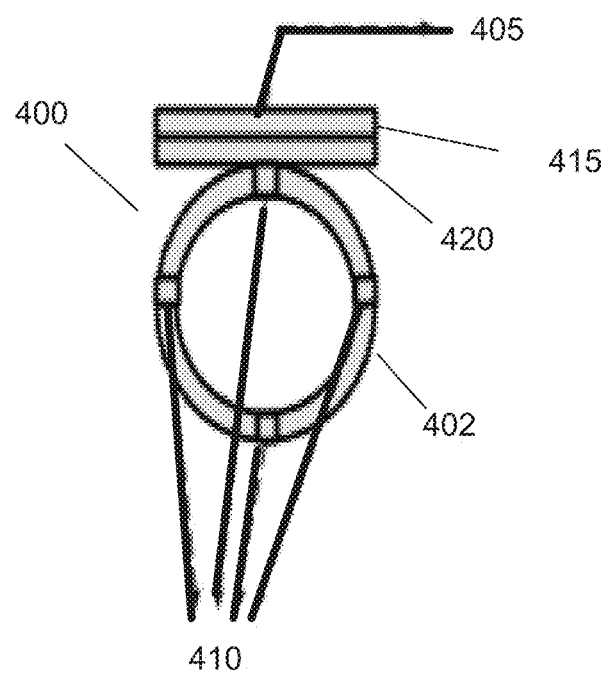
FIG. 4 illustrates a user worn vibrotactile ring including vibrating motors and configured to provide haptic feedback responses in accordance with embodiments of this invention.

In accordance with some embodiments of this invention, haptic feedback is provided by a vibrotactile ring that is worn by the user and is wirelessly connected to the imaging processing system. A vibrotactile ring in accordance with some of these embodiments of invention is illustrated in FIG. 4. The vibrotactile ring 400 includes a ring 402 and a base 405. The ring 402 has one or more vibrating motors 410 embedded around the circumference of the ring. In accordance with the shown embodiment, ring 402 includes 4 vibrating motors 410 that are embedded in a top side, bottom side, first side, and second side of the ring 402 surrounding a user finger. This configuration of the vibration motors allows directional haptic feedback to be provided as described in more detail below. One skilled in the art will recognize that the number of vibrating motors and positions around the ring may be modified depending the exact design of the ring and/or the haptic feedback to be provided as appropriate to the requirements of specific applications.

In accordance with the shown embodiment, the base 405 includes a top deck 415 and a bottom deck 420. Top deck 415 houses the processing and transceiver components of vibrotactile ring 400. The bottom deck 420 houses the power supply of the ring. The components in the top and bottom decks of base 405 may be arranged in other manners depending on the exact configuration of the components and/or design of the ring.

Processes for Providing Haptic Feedback

Figure 5:
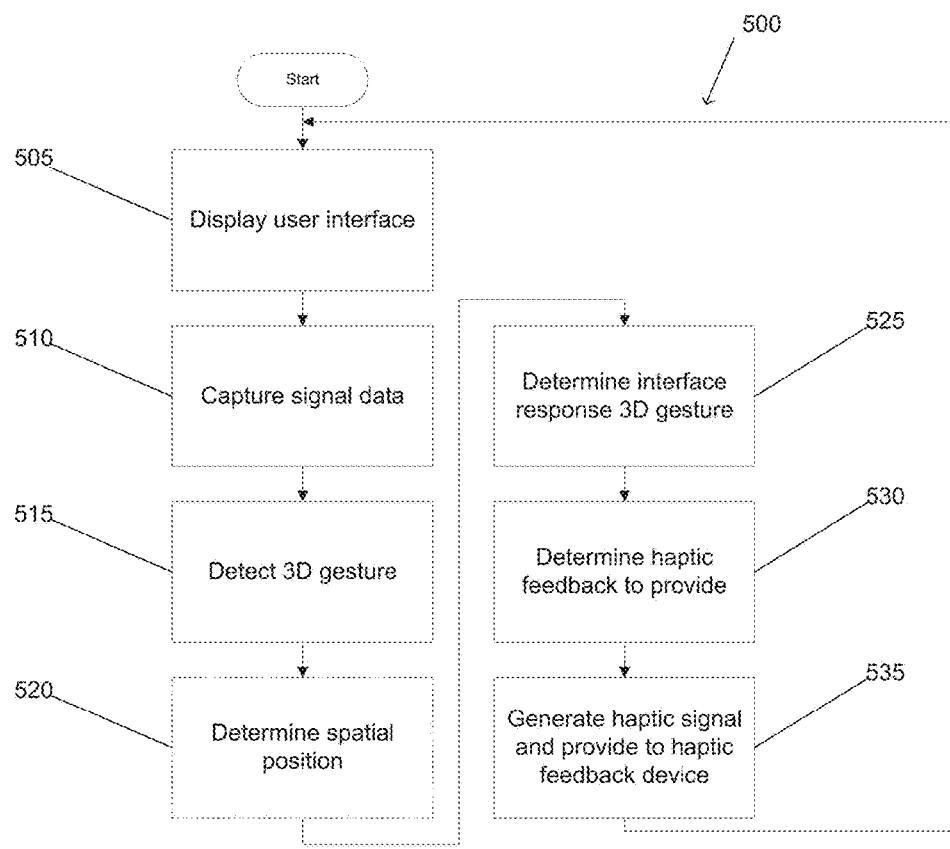
FIG. 5 illustrates a flow diagram of a process for providing haptic feedback based on gestures captured by a 3D user interface in accordance with embodiments of this invention.

In accordance with a number of embodiments of this invention, a 3D gesture based user interface system provides haptic feedback based upon the gestures captured by the system. A process for providing haptic feedback performed by an image processing system in accordance with embodiments of this invention in shown FIG. 5. In process 500, the user interface is displayed (505). The user interface includes gesture reactive interface objects that the user may manipulate and/or select using 3D gestures. As noted above, the manner in which a gesture reactive interface object is displayed and/or the interactions permitted by the interface object are modified when a user targets the interface object via a 3D gesture. For example, a pointing gesture may target a particular gesture reactive interface object. Subsequent gestures may relate to manipulating the specific object as opposed to targeting other objects within the interface. In several embodiments of the invention, the 3D gesture based user interface generates haptic feedback in response to the targeting of a gesture reactive interface object to indicate that the object has been targeted by a first 3D gesture and/or that additional 3D gestures may be available to target the interface object.

With specific regard to the process 500, the system captures signal data (510) of a targeted object in an interactive area. In accordance with some of these embodiments, the signal data includes image data captured by an image capture device. 3D gestures are detected using the signal data (515). The spatial position of the targeted object, such as a hand or fingers, within a 3D interaction zone may also optionally be determined (520).

The manner in which interface objects respond to a detected 3D gesture and/or interface objects that are substituted into the 3D gesture based user interface in response to the detected 3D gesture is determined (525). The response of gesture responsive interface objects to a 3D gesture and/or the modification of interface objects used to render a display in response to a 3D gesture can be collectively referred to as the interface response of a 3D gesture based user interface in response to a detected 3D gesture. Examples of interface responses include, but are not limited to, initializing the 3D gesture system, selecting an interactive object in the 3D gesture based user interface, and manipulating an interactive object in the user interface.

The haptic feedback provided to the user via the haptic feedback device is determined based upon one or more parameters including the detected 3D gesture, the spatial position of the target object in the 3D interaction zone during the 3D gesture, and/or the determined interface response to the detected 3D gesture (530). The haptic feedback is a tactile response to the detected gesture to enhance the user experience of the 3D gesture based user interface. The tactile response may be used to provide tactile feedback when performing a 3D gesture, to indicate a current state of the interaction between the user and a targeted gesture reactive interface object, and/or guide the user in the use of the 3D gesture based user interface in any other way appropriate to the requirements of a specific application. The following are some specific examples of haptic feedback that can be utilized in accordance with embodiments of this invention. When a gesture is detected and the system is initialized, a certain vibration pattern is provided as haptic feedback. When the spatial position of the target object during the gesture moves out of the interactive area, another certain vibration pattern is provided as haptic feedback. The vibration pattern provided may indicate the direction in which the target object moved out of the 3D interaction zone in accordance with some of these embodiments. In addition, other vibration patterns may be provided as the target object is approaching a border of the 3D interaction zone to warn a user that the border is approaching. In accordance with some of these embodiments, the vibration patterns provided may gain intensity as the target object approaches the border. When a particular action is detected such as a tap or a swipe, a vibration pattern that mimics the feeling of the function on a touch pad may be provided as haptic feedback. Any number of other gestures, spatial relations, interface responses, and/or combinations of these inputs may invoke particular haptic feedback.

After the haptic feedback response is determined, a haptic response signal to send to the haptic feedback device is generated and provided to the haptic feedback device (535). This may be performed by looking up a code for the desired device in a table or other memory or generating a specific haptic code in response to the determination of the code to provide. In accordance with some embodiments where the haptic feedback device is connected to the image processing system, the haptic response signal is provided to the haptic feedback device through a haptic feedback device interface. In accordance with other embodiments where the haptic feedback device is communicatively connected to the image processing device, the haptic response signal is transmitted via message. In accordance with some of these embodiments, the haptic feedback device is wirelessly connected to the image processing system and the haptic response signal is sent via a message over the wireless connection.

After the haptic response signal is provided to the haptic feedback device, process 500 is repeated for the next detected gesture. In accordance with some embodiments of this invention, the process allows ongoing haptic feedback during a 3D gesture based interact session to prompt the user for inputs. For example, the haptic feedback may be used during an initialization process to prompt gestures that may be used to define the 3D interaction zone. Further, the haptic feedback may be used to direct the user to move the target object into a particular area of the 3D interaction zone in accordance with some embodiments. One skilled in the art will recognize that the user may be prompted to do any number of actions using the haptic feedback in accordance with embodiments of this invention.

Examples of Haptic Feedback

In accordance with some embodiments of this invention, the haptic feedback device is a vibrotactile ring as shown with respect to FIG. 4. The following are some examples of gestures and associated haptic feedback responses generated by 3D gesture based user interfaces in accordance with embodiments of this invention. One skilled in the art will recognize that other haptic feedback responses may be provided with respect to any of a variety of gestures as appropriate to the requirements of specific applications in accordance with embodiments of the invention.

In certain embodiments, a 3D interaction zone is defined in 3D space and motion of a finger and/or gestures within a plane in the 3D interaction zone parallel to the plane of the display can be utilized to determine the location on which to overlay a target on a display. A feature of systems in accordance with many embodiments of the invention is that they can utilize a comparatively small interaction zone. In several embodiments, the interaction zone is a predetermined 2D or 3D space defined relative to a tracked hand such that a user can traverse the entire 2D or 3D space using only movement of the user's finger and or wrist. Utilizing a small interaction zone can enable a user to move a target from one side of a display to another in an ergonomic manner. Larger movements, such as arm movements, can lead to fatigue during interaction of even small duration. In several embodiments, the size of the interaction zone is determined based upon the distance of the tracked hand from a reference camera and the relative position of the tracked hand in the field of view. In addition, constraining a gesture based interactive session to a small interaction zone can reduce the overall computational load associated with tracking the human hand during the gesture based interactive session. When an initialization gesture is detected, an interaction zone can be defined based upon the motion of the tracked hand. In several embodiments, the interaction zone is defined relative to the mean position of the tracked hand during the initialization gesture. In a number of embodiments, the interaction zone is defined relative to the position occupied by the tracked hand at the end of the initialization gesture. In certain embodiments, the interaction zone is a predetermined size. In many embodiments, the interaction zone is a predetermined size determined based upon human physiology. In several embodiments, a 3D interaction zone corresponds to a 3D that is no greater than 160 mm×90 mm×200 mm. In certain embodiments, the size of the 3D interaction zone is determined based upon the scale of at least one of the plurality of templates that matches a part of a human hand visible in a sequence of frames of video data captured during detection of an initialization gesture and the distance of the part of the human hand visible in the sequence of frames of video data from the camera used to capture the sequence of frames of video data. In a number of embodiments, the size of a 3D interaction zone is determined based upon the region in 3D space in which motion of the human hand is observed during the initialization gesture. In many embodiments, the size of the interaction zone is determined based upon a 2D region within a sequence of frames of video data in which motion of the part of a human hand is observed during the initialization gesture. In systems that utilize multiple cameras and that define a 3D interaction zone, the interaction zone can be mapped to a 2D region in the field of view of each camera. During subsequent hand tracking, the images captured by each camera can be cropped to the interaction zone to reduce the number of pixels processed during the gesture based interactive session. Although specific techniques are discussed above for defining interaction zones based upon hand gestures that do not involve gross arm movement (i.e. primarily involve movement of the wrist and finger without movement of the elbow or shoulder), any of a variety of processes can be utilized for defining interaction zones and utilizing the interaction zones in conducting 3D gesture based interactive sessions as appropriate to the requirements of specific applications in accordance with embodiments of the invention.

Figure 6:
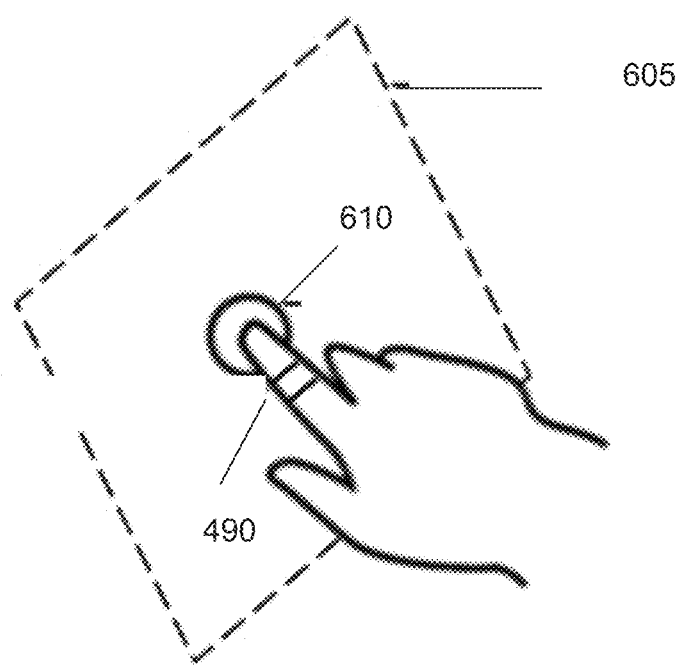
FIG. 6 illustrates a gesture recognized by a 3D gesture based user interface in accordance with embodiments of this invention.

An example of a 3D interaction zone for a 3D interactive system having a vibrotactile ring as a haptic feedback device in accordance with embodiments of this invention is shown in FIG. 6. A vibrotactile ring 490 is worn on a finger of the user. The finger is the tracked target in accordance with embodiments of this invention. A 3D interaction zone 605 is in a volume of space visible within image data captured by the image capture device(s) used to detect gestures. Tracked point 610 is an area in the 3D interaction zone that is tracked through a series of images to detect a gesture by the user.

Figure 7:
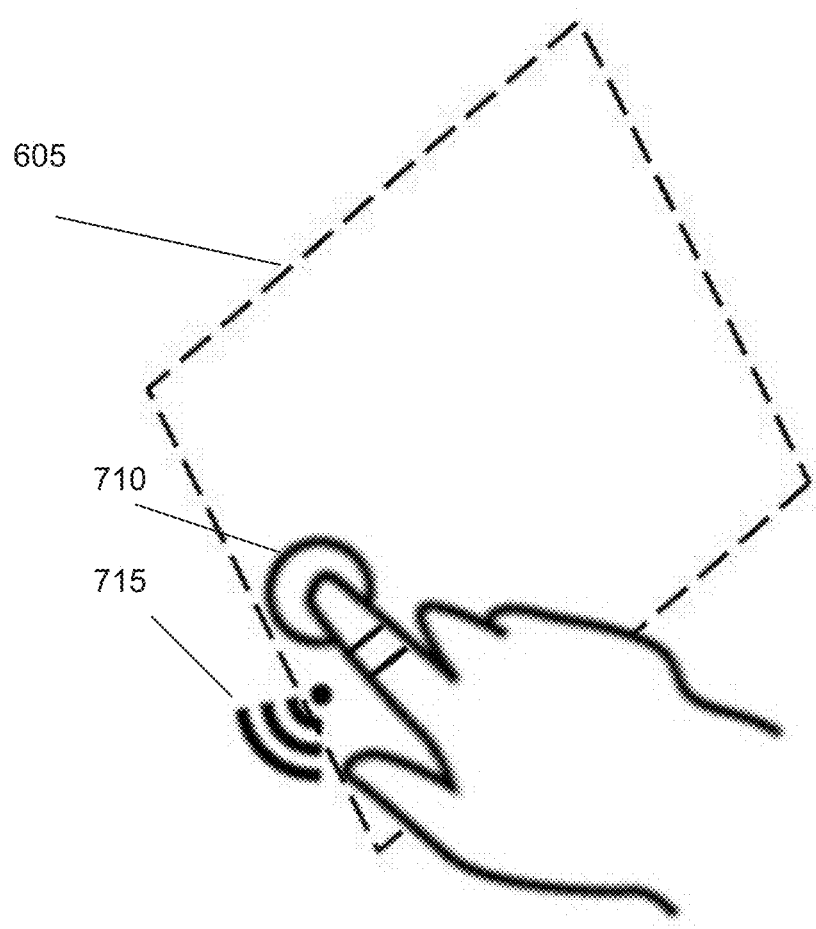
FIG. 7 illustrates a gesture recognized by the 3D gesture based user interface that moves a targeted point toward the left boundary of the 3D interaction zone and a haptic feedback response provided by the system in response to the gesture in accordance with embodiments of this invention.
Figure 8:
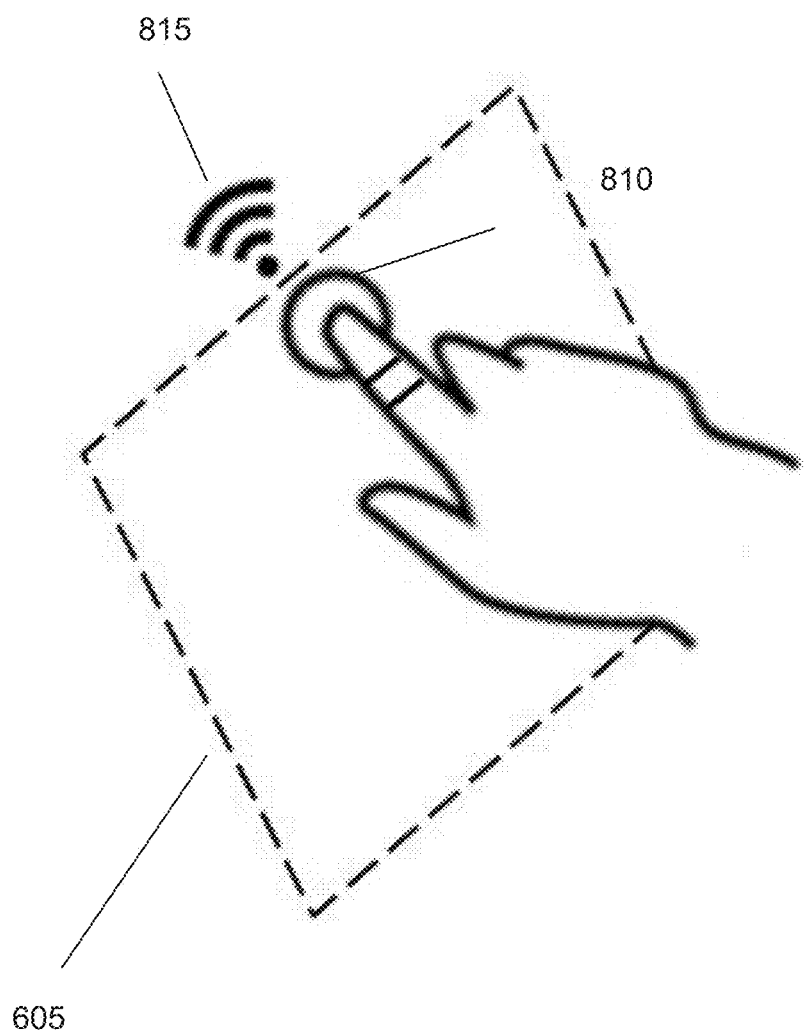
FIG. 8 illustrates a gesture recognized by the 3D gesture based user interface that moves a targeted point toward the top boundary of the 3D interaction zone and a haptic feedback response provided by the system in response to the gesture in accordance with embodiments of this invention.

Haptic feedback that warns when a target object is moving out of the 3D interaction zone in accordance with embodiments of this invention is shown in FIGS. 7 and 8. In FIG. 7, the user moves the finger towards the left border of the 3D interaction zone as shown by tracked point 710. In response to the image processing system detecting the movement towards the left border of the 3D interaction zone, a haptic feedback 715 that includes a vibration of the left side of the vibrotactile ring 490 is generated to alert the user to proximity to the left border. In accordance with some embodiments, of this invention, the intensity of the vibration on the left side of the ring may increase as tracked area 710 moves closer to the left border. Furthermore, the vibrations of the haptic feedback 715 may be provided in a certain pattern to distinguish the left border warning from other types of haptic feedback in accordance with embodiments of this invention. In several embodiments, an image processing system determines the pose of a human hand wearing the vibrotactile ring and determines the direction (locations around the ring) in which to apply vibrations based upon the pose of the human hand to account for possible rotations of the vibrotactile ring due to hand pose. In FIG. 8, the user moves the finger towards the top border of the 3D interaction zone as shown by tracked point 810. In response to the image processing system detecting the movement towards the top border of the 3D interaction zone, a haptic feedback 815 that includes a vibration of the top side of the vibrotactile ring 490 is generated to alert the user to proximity to the top border. In accordance with some embodiments of this invention, the intensity of the vibration on the top side of the ring may increase as tracked area 810 moves closer to the left border. Furthermore, the vibrations of the haptic feedback 815 may be provided in a certain pattern to distinguish the left border warning from other types of haptic feedback in accordance with embodiments of this invention. The warning for proximity of the tracked point to the right and bottom borders of the 3D interaction zone operate in a similar matter and are omitted from brevity.

Figure 9:
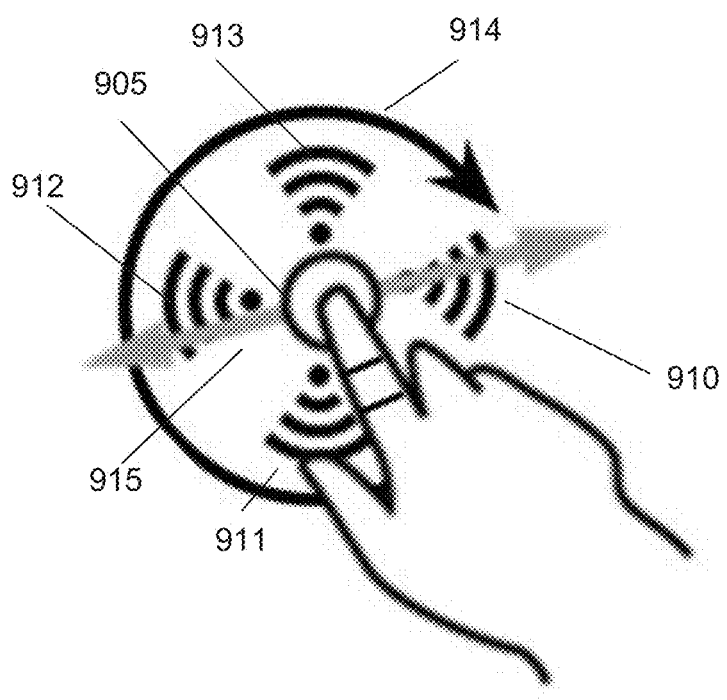
FIG. 9 illustrates an initializing gesture recognized by the 3D gesture based user interface and a haptic feedback response provided by the system in response to the gesture in accordance with embodiments of this invention.

The haptic feedback in response to a wake up gesture in accordance with embodiments of this invention is shown in FIG. 9. In accordance with these embodiments, the 3D gesture based user interface includes a predefined wakeup gesture to start interaction. When the system detects the wake up gesture which includes moving the target point 915 in one direction along the line indicated by arrow 906, the system provides an initialization haptic feedback that includes sequential vibrations 910-913 around the circumference of ring 490 as indicated by arrow 914.

Figure 10:
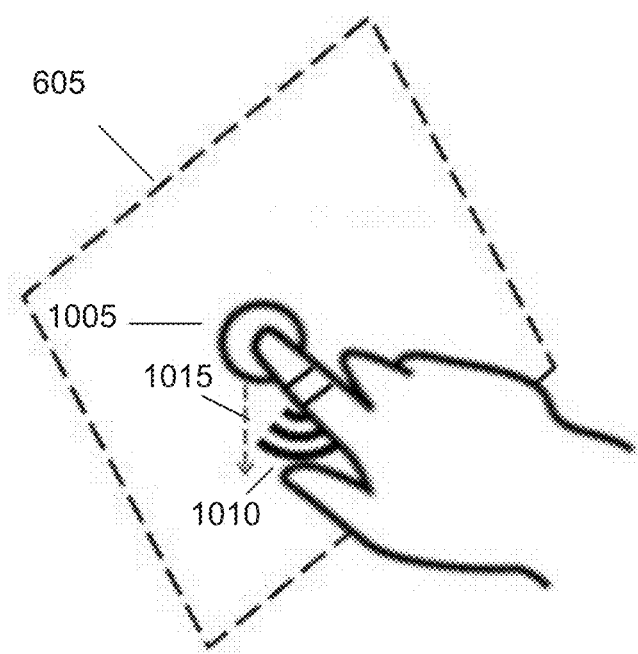
FIG. 10 illustrates a tap gesture recognized by the 3D gesture based user interface and a haptic feedback response provided by the system in response to the gesture in accordance with embodiments of this invention.

A haptic feedback in response to the detection of a tap gesture in accordance with embodiments of this invention is shown in FIG. 10. A tap gesture is detected by a forward movement of the tracked point 1005 indicated by arrow 1015. In response to the detection of the tap, haptic feedback 1010 that includes a specific vibration that simulates the sense of tapping on a surface is provided. In accordance with the shown embodiment, the specific vibration of haptic feedback 1010 is a vibration of the bottom portion of the circumference of the vibrotactile ring in accordance with some of these embodiments. In accordance with some embodiments, the haptic feedback 1010 is provided from the start to the end of the tap gesture in accordance with some embodiment. In accordance with a number of embodiments, the haptic feedback is an indication to the user to stop moving the finger or other target object to prevent the completion of a command to the 3D gesture based interface. The efficiency of a 3D gesture based user interface can significantly be increased by providing warnings that enable users to avoid providing unintended commands by ceasing a movement that will be interpreted by an image processing system as being a 3D gesture that will trigger an interface response.

Figure 11:
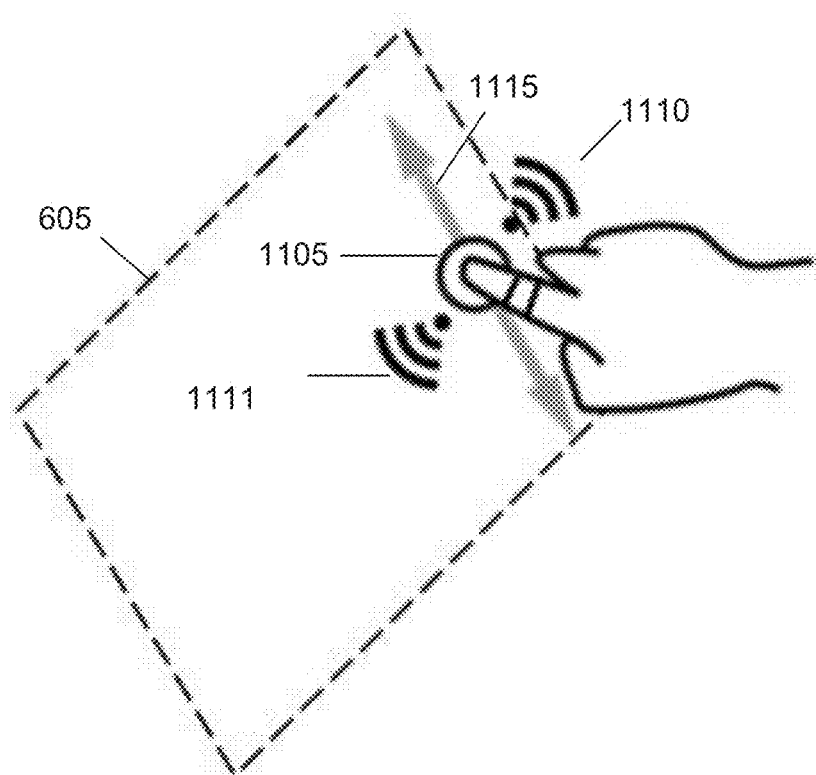
FIG. 11 illustrates a scrolling gesture recognized by the 3D gesture based user interface and a haptic feedback response provided by the system in response to the gesture in accordance with embodiments of this invention.

A haptic feedback in response to the detection of a gesture indicating a scrolling action in accordance with embodiments of this invention is shown in FIG. 11. A scrolling gesture is detected by a vertically linear movement of the target point 1105 as indicated by arrow 1115. The motion may be in either vertical direction in accordance with embodiments of this invention. In response to the detection of the scrolling gesture, haptic feedback 1110 that includes a specific vibration that simulates the sense of moving a finger around the interior surface of a pipe is provided in accordance with embodiments. In accordance with some embodiments, the haptic feedback 1110 provided is vibrating each of the opposing sides of vibrotactile ring 490 in accordance with some embodiments. When a gesture moves the target point 1105 outside the scrollbar, the vibration on the exiting side of the ring intensifies to simulate a boundary in accordance with some embodiments.

Figure 12:
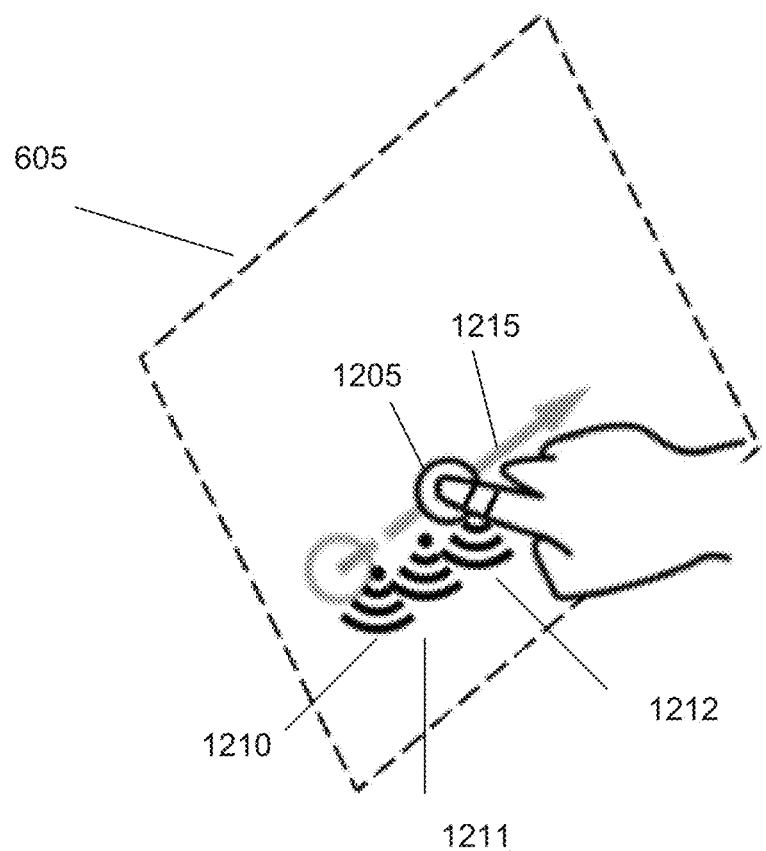
FIG. 12 illustrates a scrubbing gesture recognized by the 3D gesture based user interface and a haptic feedback response provided by the system in response to the gesture in accordance with embodiments of this invention.

A haptic feedback in response to the detection of a gesture indicating a scrubbing action in accordance with embodiments of this invention is shown in FIG. 12. A scrubbing gesture is a horizontally linear movement controlling a scrub bar or its equivalent. A scrubbing gesture is detected by a horizontally linear movement of the target point 1205 as indicated by arrow 1215. The motion may be in either horizontal or vertical direction in accordance with embodiments of this invention. In response to the detection of the scrubbing gesture, haptic feedback 1210 that includes a specific vibration that simulates the sense of rubbing a finger across a surface is provided in accordance with embodiments of this invention. In accordance with some embodiments, the haptic feedback 1010 is provided mildly vibrating each of the bottom side of vibrotactile ring 490 until the scrubbing is completed in accordance with some embodiments. In a number of embodiments, the 3D gesture based user interface includes gesture reactive affordances. The targeting of an affordance by a 3D gesture can cause an interface response that includes the provision of a haptic feedback response. The interface response can continue and the haptic feedback continues so long as a 3D gesture is performed (e.g. a pointing 3D gesture) and/or until a cancelling 3D gesture is performed. As can readily be appreciated, any of a variety of haptic feedbacks can be provided as appropriate to the requirements of specific 3D gesture based user interfaces in accordance with embodiments of the invention.

Timing Diagram of Haptic Feedback

Figure 13:
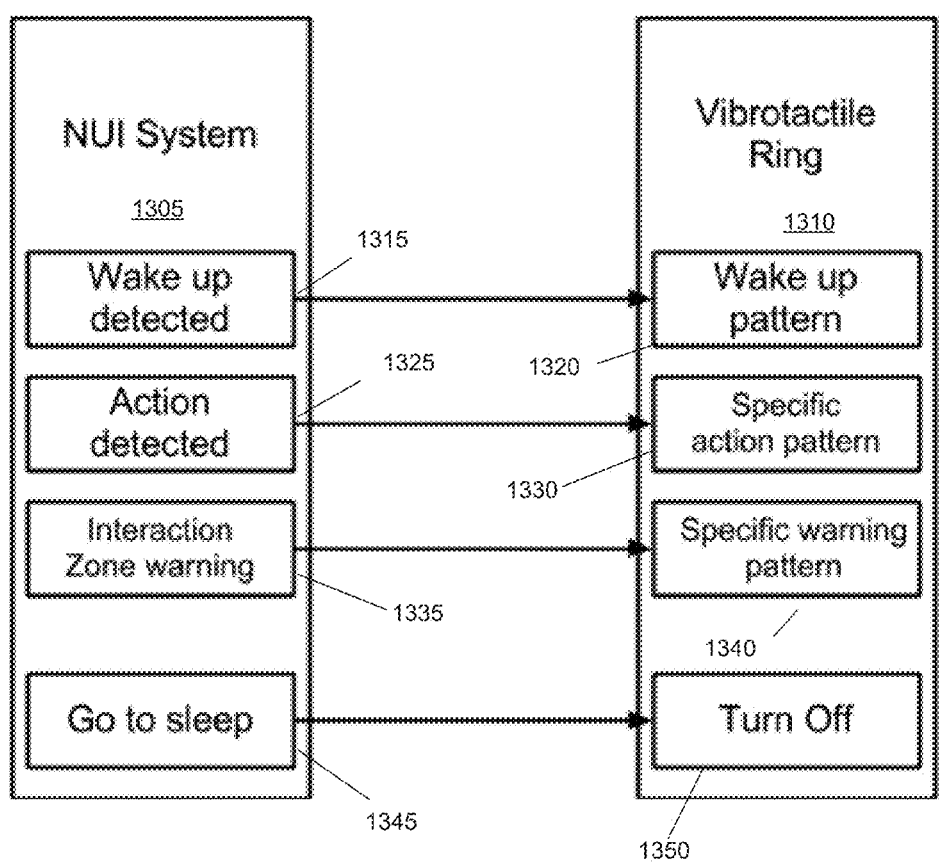
FIG. 13 illustrates a timing diagram of gestures detected and haptic feedback provided in accordance with some embodiments of this invention.

An example of typical haptic feedback provided over a period of time by a 3D gesture based user interface having a vibrotactile ring as a haptic feedback device in accordance with embodiments of this invention is shown in FIG. 13. The 3D gesture based user interface 1305 detects a wake-up gesture 1315 and sends a haptic response signal to vibrotactile ring 1310 to provide a wake up vibration pattern 1320 as haptic feedback. When a 3D gesture indicating a first action 1325 is detected by 3D gesture based user interface 1305, a haptic response signal is transmitted from 3D gesture based user interface to vibrotactile ring 1310. In response to receiving the signal, vibrotactile ring 1310 provides a specific action vibration pattern 1330 that is associated with the detected 3D gesture and/or first action. Another 3D gesture indicating a second action 1335 is then detected by the 3D gesture based user interface 1305 and a haptic response signal is sent by 3D gesture based user interface 1305 to vibrotactile ring 1310, which provides another specific action vibration pattern 1340 that is associated with the second gesture and/or second action. As noted above, 3D gesture based user interfaces in accordance with many embodiments of the invention may not permit the second action to be performed until the 3D gesture associated with the first action is received. In several embodiments, the 3D gesture based user interface is configured to detect a gesture indicating a go to sleep action 1345 and sends a haptic feedback signal that can cause the vibrotactile ring 1310 to provide a turn off vibration pattern and/or perform a turn off process 1350.

Haptic Feedback Response

Figure 14:
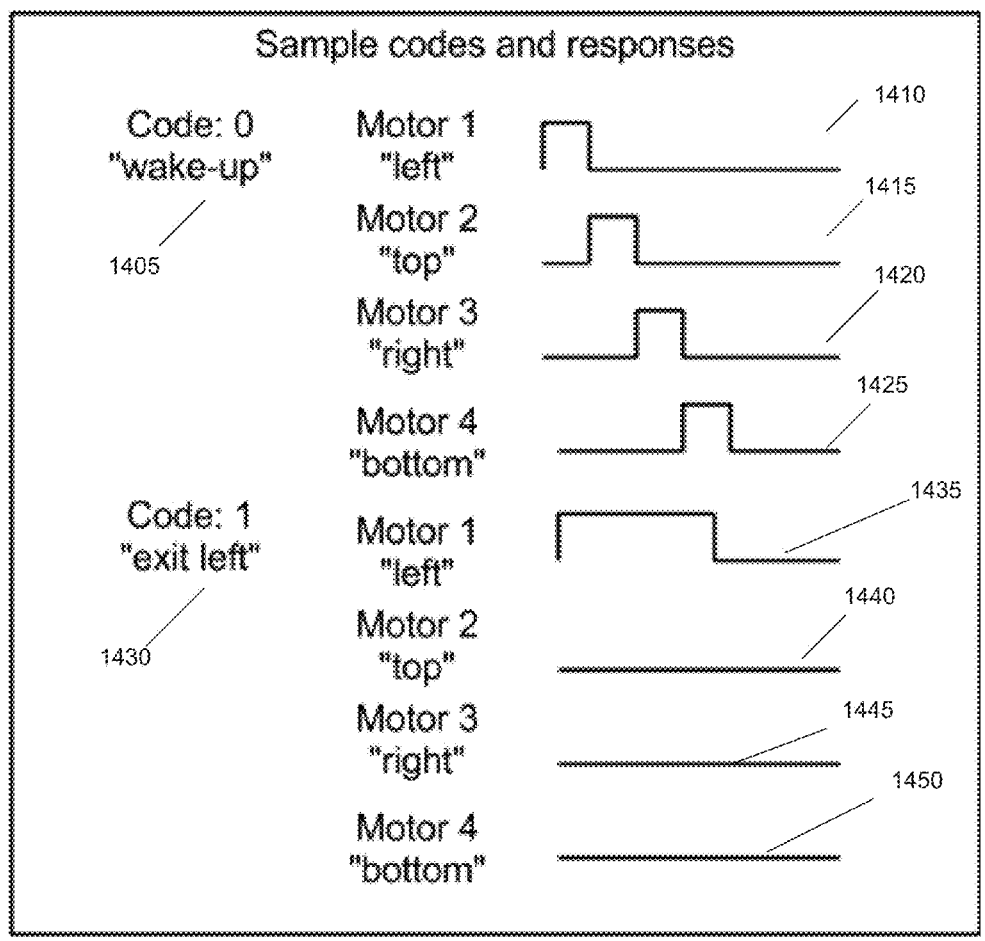
FIG. 14 illustrates signal diagrams for haptic feedback responses associated with specific actions detected in accordance with some embodiments of this invention.

A 3D gesture based user interface detects a gesture and generates a haptic response signal that indicates to a haptic feedback device the haptic feedback response to provide. The conversion of haptic response signals to a haptic feedback response in a system including a 3D gesture based user interface incorporating a vibrotactile ring as a haptic feedback device in accordance with embodiments of this invention is shown in FIG. 14. The imaging processing system detects a gesture and generates a haptic response signal that indicates the haptic feedback to provide based on the gesture, and transmits the signal to the vibrotactile ring. The vibrotactile ring has a microcontroller which maps of an input code in the haptic response signal to Pulse Width Modulation (PWM) patterns in its internal memory. The vibrotactile ring receives the haptic response signal and determines the input code in the signal. The ring then retrieves a particular PWM pattern associated with the input code, and provides the PWM pattern to the pulse width modulator. The pulse width modulator drives the motors in accordance with the PWM pattern.

In the illustrated embodiment, the code for a wake-up response is 0. However, other codes can be used without departing from this embodiment. The PWM pattern associated with wake-up code is shown by timing pulse 1410 applied to a first or left motor, timing pulse 1415 applied to a second or top motor, timing pulse 1420 applied to a third or right motor, and timing pulse 1425 applied to a fourth or bottom motor. As can be seen from pulses 1410, 1415, 1420, and 1425, the pulse for each subsequent motor is delayed until at least the end of the previous signal to cause a sequential vibration that travels the circumference of the vibrotactile ring.

Also in accordance with the shown embodiment, the code for a left exit in which the target object approaches a left boundary of the 3D interaction zone is 1. However, other codes may be used. The vibrotactile ring receives the code and associates the code 1 with the left exit response. The PWM pattern associated with exit code is shown by timing pulse 1435 applied to a first or left motor, timing pulse 1440 applied to a second or top motor, timing pulse 1445 applied to a third or right motor, and timing pulse 1450 applied to a fourth or bottom motor. As can be seen from pulses 1435, 1440, 1445, and 1450, only a sustained pulse is applied to the first or left motor. There is no pulse applied to the other motors.

Various Types of Haptic Feedback Devices

As discussed above, the haptic feedback device may be embedded in a system that includes the image processes such as, but not limited to, laptop computers, desktop computers, tablets, smartphones, and wearable computing devices such as (but not limited to) rings, wrist bands, watches, and glasses in accordance with embodiments of this invention. In accordance with many embodiments of this invention, the haptic feedback device may be implemented using components already incorporated into a device. For example, the haptic feedback device may utilize built-in vibration motors (or other devices for generating vibrations) present in most smartphones, tablets, and eBook readers. In accordance with these embodiments, the image processing system would send a signal to an application resident on the device that activates the built-in vibration motors within the device when a gesture is detected. Furthermore, the tactile device may be embedded in a device that is proximate the display to provide a user haptic feedback. For example, the haptic feedback device may be embedded in the steering wheel of an automobile with a digital dashboard. This would allow the user to user gestures to control the digital dashboard without looking at the dashboard. Thus allowing the user to concentrate on the road.

Figure 15:
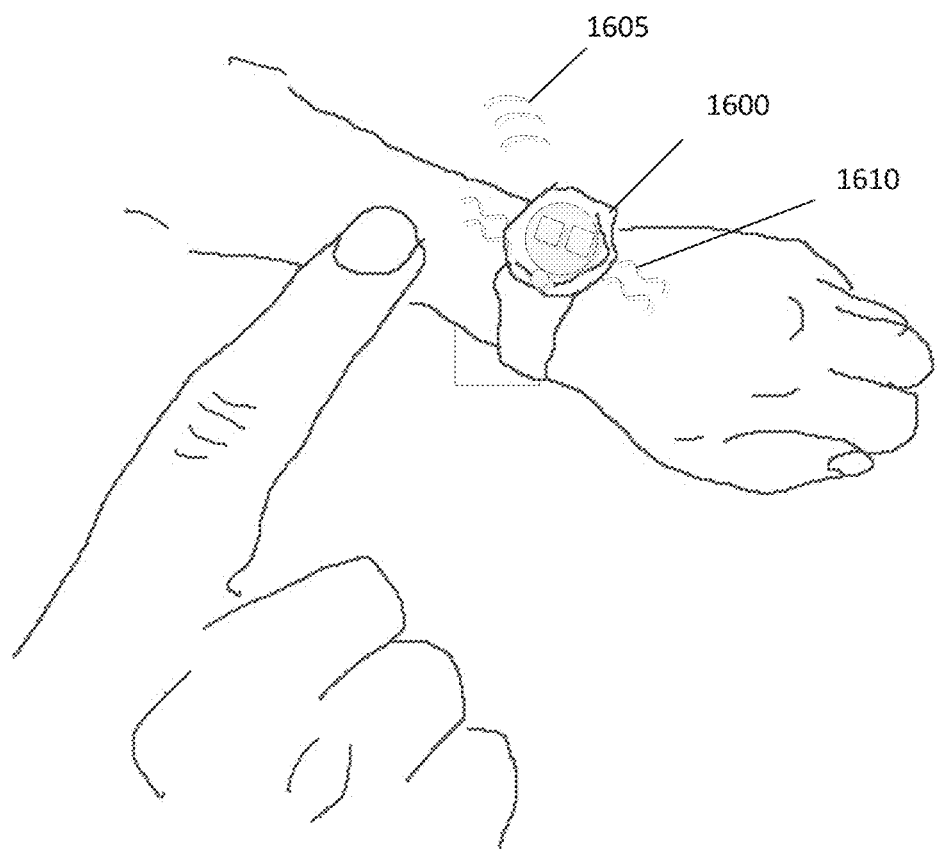
FIG. 15 illustrates a watch used as a haptic feedback device for a 3D gesture based user interface in accordance with embodiments of this invention.

A smart-watch that includes a 3D gesture based user interface and has one or more vibration motors embedded in the smart-watch in accordance with embodiments of this invention is shown in FIG. 15. Smart-watch 1600 has an active or passive 3D sensing capability. The 3D sensing capability may be provided by ultrasound, one or more camera sensors, a time of flight sensor, a near field sensor, or any other gesture capturing device. A user may initiate the 3D gesture based user interface by one of several methods including, but not limited to, performing an initiation gesture, touching the screen, or manipulating a mechanical knob. The user may then interact using the 3D gesture based user interface. When the 3D gesture based user interface detects a gesture, haptic feedback for the gesture is provided by vibrations 1610 and/or sound 1605 emitted by the watch.

Although certain specific features and aspects of a gaming system have been described herein, many additional modifications and variations would be apparent to those skilled in the art. For example, the features and aspects described herein may be implemented independently, cooperatively or alternatively without deviating from the spirit of the disclosure. It is therefore to be understood that gaming system may be practiced otherwise than as specifically described. Thus, the foregoing description of the gaming system should be considered in all respects as illustrative and not restrictive, the scope of the claims to be determined as supported by this disclosure and the claims' equivalents, rather than the foregoing description.

What is claimed is:

1. An image processing system, configured to conduct three-dimensional (3D) gesture based interactive sessions, that provides haptic feedback comprising:
    a memory containing an image processing application; and
    a processor configured via the image processing application to:
        receive captured image data and process the captured image data to detect a target object, the target object being a human hand, the captured image being captured by at least one camera,
        detect, based upon locations and poses of the detected target object, a 3D initialization gesture,
        define, based upon a detection of the initialization gesture, a 3D interaction zone having an interior and a boundary, the boundary of the 3D interaction zone being defined based on spatial regions occupied by the target object during the initialization gesture, the 3D interaction zone corresponding to a portion of the captured image data smaller than a field of view of the at least one camera,
        detect, constrained to the portion of the captured image data corresponding to the interior of the 3D interaction zone, a 3D gesture comprising a plurality of 3D spatial positions of the target object in the 3D interaction zone from the portion of the captured image data,
        determine a spatial position of the 3D spatial positions of the target object in the 3D interaction zone during the 3D gesture;
        determine whether the target object has moved from a location in the interior of the 3D interaction zone to a location proximate the boundary of the 3D interaction zone during the 3D gesture from the spatial position of the 3D spatial positions of the target object in the 3D interaction zone, the portion of the captured image data corresponding to the 3D interaction zone being constant during the 3D gesture,
        determine a haptic feedback response based on a determination that the target object is proximate the boundary of the 3D interaction zone,
        generate a haptic response signal that indicates the determined haptic feedback response, and
        provide the haptic response signal to a haptic feedback device, wherein the haptic feedback device is a vibrotactile ring comprising a plurality of vibrating motors and a controller is configured to receive the haptic response signal and generate signals that selectively drive the plurality of vibrating motors to generate the determined haptic feedback response.

2. The image processing system of claim 1 wherein the processor is further configured to define the 3D interaction zone based upon motions of the target object.

3. The image processing system of claim 1 wherein the processor is configured to define the 3D interaction zone based upon motions of the target object during the initialization gesture.

4. The image processing system of claim 1 wherein the processor is further configured to determine a size of the 3D interaction zone based upon a scale of at least one of a plurality of templates that matches a part of the target object visible in a sequence of frames of video data captured during detection of the initialization gesture and a distance of the part of the target object visible in the sequence of frames of video data from the at least one camera used to capture the sequence of frames of video data.

5. The image processing system of claim 1 wherein the processor is further configured to determine a size of the 3D interaction zone based upon a region in 3D space in which motion of the target object is observed during the initialization gesture.

6. The image processing system of claim 1 wherein the 3D interaction zone is a predetermined size determined based upon human physiology.

7. The image processing system of claim 1 wherein the 3D gesture detected is a pointing gesture that is interacting with a gesture responsive interface object.

8. The image processing system of claim 1 wherein the 3D gesture detected is a pointing gesture that is interacting with an affordance.

9. The image processing system of claim 1 wherein the processor is further configured to determine an interactive response to the detected 3D gesture and wherein a haptic feedback response is determined based upon the interactive response.

10. The image processing system of claim 9 wherein the interactive response to the detected 3D gesture is an interaction with a gesture reactive interface object.

11. The image processing system of claim 9 wherein the detected 3D gesture targets a gesture reactive interface object and the interactive response is to unlock a new set of 3D gestures.

12. The image processing system of claim 9 wherein the detected 3D gesture is a tapping motion and the interactive response is interacting with a gesture response interface object.

13. The image processing system of claim 9 wherein the detected 3D gesture is a pointing motion, the interactive response is a tap, and a determined haptic feedback is a specific vibration that simulates the sense of tapping on a surface.

14. The image processing system of claim 9 wherein the detected 3D gesture is a movement along a substantially vertical axis, the interactive response is determined to be a scrolling action and a haptic feedback response is a specific vibration that simulates a sense of moving a finger through an interior surface of a pipe.

15. The image processing system of claim 9 wherein the detected 3D gesture is a movement along a substantially horizontal axis, the interactive response is determined to be a scrubbing action and a haptic feedback response is a specific vibration that simulates a sense of rubbing a finger across a surface.

16. The image processing system of claim 1 wherein the processor is configured to provide the haptic response signal to the haptic feedback device by transmitting the haptic response signal to the haptic feedback device via a wireless connection.

17. The image processing system of claim 1 wherein the processor is configured to provide the haptic response signal to the haptic feedback device via a haptic feedback device interface.

18. The image processing system of claim 1 wherein
the plurality of vibrating motors are situated around a circumference of the vibrotactile ring; and
the controller is configured to receive the haptic response signal and generate signals that selectively drive each of the plurality of vibrating motors to generate the determined haptic response.

19. The image processing system of claim 1 wherein the controller generates specific signals to drive each of the plurality of vibrating motors to provide a specific vibration pattern as the haptic response.

20. The image processing system of claim 1 wherein the processor is configured to provide the haptic response signal via a wireless connection to the vibrotactile ring and the vibrotactile ring further comprises a wireless receiver that receives the haptic response signal via the wireless connection and provides the haptic response signal to the controller.

21. The image processing system of claim 1 wherein the processor is configured to detect a hand pose associated with the 3D gesture in the captured image data and determine the orientation of the vibrotactile ring relative to a 3D interaction zone based upon the hand pose, and generate a haptic response signal based upon the orientation of the vibrotactile ring relative to the 3D interaction zone.

22. The image processing system of claim 1, wherein the haptic feedback response indicates the direction in which the boundary is located relative to the target object.

23. A method for providing haptic feedback for three-dimensional (3D) gesture based interactive sessions that provides haptic feedback comprising:
receiving captured image data and processing the captured image data to detect a target object in an image processing system, the target object being a human hand, the captured image being captured by at least one camera;
detecting, based upon locations and poses of the detected target object, a 3D initialization gesture;
defining, based upon a detection of the initialization gesture, a 3D interaction zone having an interior and a boundary, the boundary of the 3D interaction zone being defined based on spatial regions occupied by the target object during the initialization gesture, the 3D interaction zone corresponding to a portion of the captured image data smaller than a field of view of the at least one camera;
detecting a 3D gesture comprising a plurality of 3D spatial positions of the target object in the 3D interaction zone from the portion of the captured image data using the image processing system, the detecting being constrained to the portion of the captured image data corresponding to the interior of the 3D interaction zone;
determining a spatial position of the 3D spatial positions of the target object in the 3D interaction zone during the 3D gesture;
determining whether the target object has moved from a location in the interior of the 3D interaction zone to a location proximate the boundary of the 3D interaction zone during the 3D gesture from the spatial position of the 3D spatial positions of the target object in the 3D interaction zone, the portion of the captured image data corresponding to the 3D interaction zone being constant during the 3D gesture;
determining a haptic feedback response based on a determination that the target object is proximate the boundary of the 3D interaction zone;
generating a haptic response signal that indicates the determined haptic feedback response using the image processing system; and
providing the haptic response signal from the image processing system to a haptic feedback device, wherein the haptic feedback device is a vibrotactile ring comprising a plurality of vibrating motors and a controller is configured to receive the haptic response signal and generate signals that selectively drive the plurality of vibrating motors to generate the determined haptic feedback response.

24. The method of claim 23, wherein the haptic feedback response indicates the direction in which the boundary is located relative to the target object.

25. An image processing system, configured to conduct three-dimensional (3D) gesture based interactive sessions, that provides haptic feedback comprising:
a memory containing an image processing application; and
a processor configured via the image processing application to:
receive captured image data and process the captured image data to detect a target object, the target object being a human hand, the captured image being captured by at least one camera,
detect, based upon locations and poses of the detected target object, a 3D initialization gesture,
define, based upon a detection of the initialization gesture, a 3D interaction zone having an interior and a boundary, the boundary of the 3D interaction zone being defined based on spatial regions occupied by the target object during the initialization gesture, the 3D interaction zone corresponding to a portion of the captured image data smaller than a field of view of the at least one camera,
detect, constrained to the portion of the captured image data corresponding to the interior of the 3D interaction zone, a 3D gesture comprising a plurality of 3D spatial positions of the target object in the 3D interaction zone from the portion of the captured image data,
determine a spatial position of the 3D spatial positions of the target object in the 3D interaction zone during the 3D gesture;

determine whether the target object has moved from a location in the interior of the 3D interaction zone to a location proximate the boundary of the 3D interaction zone during the 3D gesture from the spatial position of the 3D spatial positions of the target object in the 3D interaction zone, the portion of the captured image data corresponding to the 3D interaction zone being constant during the 3D gesture, determine a haptic feedback response based on a determination that the target object is proximate the boundary of the 3D interaction zone, generate a haptic response signal that indicates the determined haptic feedback response, and provide the haptic response signal to a haptic feedback device, wherein the haptic feedback device is embedded in a steering wheel of an automobile comprising a plurality of vibrating motors and a controller is configured to receive the haptic response signal and generate signals that selectively drive the plurality of vibrating motors to generate the determined haptic feedback response.

* * * * *